(12) United States Patent    (10) Patent No.: US 7,958,132 B2
Sutanto et al.    (45) Date of Patent: Jun. 7, 2011

(54) VOTING BASED SCHEME FOR ELECTRONIC DOCUMENT NODE REUSE

(75) Inventors: Herry Sutanto, Kirkland, WA (US); Jamie Wakeam, Redmond, WA (US); Jerome Turner, Redmond, WA (US); Richard Duncan, Kirkland, WA (US); Sashi Raghupathy, Redmond, WA (US); Timothy H. Kannapel, Bellevue, WA (US); Zoltan Szilagyi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1845 days.

(21) Appl. No.: 10/774,575

(22) Filed: Feb. 10, 2004

(65) Prior Publication Data

US 2005/0175245 A1    Aug. 11, 2005

(51) Int. Cl.
*G06F 7/00* (2006.01)
(52) U.S. Cl. .................................. 707/755; 382/187
(58) Field of Classification Search ........................ None
See application file for complete search history.

(56) References Cited

U.S. PATENT DOCUMENTS

| | | | |
|---|---|---|---|
| 5,394,484 A | | 2/1995 | Casey et al. |
| 5,454,046 A | * | 9/1995 | Carman, II .................... 382/186 |
| 5,559,897 A | | 9/1996 | Brown et al. |
| 5,581,634 A | * | 12/1996 | Heide ............................ 382/226 |
| 5,680,480 A | * | 10/1997 | Beernink et al. ............. 382/187 |
| 5,710,916 A | * | 1/1998 | Barbara et al. ................... 1/1 |
| 5,911,013 A | | 6/1999 | Taniishi |
| 5,991,441 A | * | 11/1999 | Jourjine ......................... 382/187 |
| 6,092,064 A | * | 7/2000 | Aggarwal et al. ............. 707/694 |
| 6,112,173 A | * | 8/2000 | Hirayama ..................... 704/242 |
| 6,285,786 B1 | * | 9/2001 | Seni et al. ..................... 382/187 |
| 6,377,259 B1 | | 4/2002 | Tenev et al. |
| 6,556,983 B1 | * | 4/2003 | Altschuler et al. ............. 706/55 |

(Continued)

FOREIGN PATENT DOCUMENTS

EP    0 902 379 A2    3/1999

OTHER PUBLICATIONS

"Recognizing Mathematical Expressions using Tree Transformation," by Zanibbi et al, IN: IEEE Transactions on Pattern Analysis and Machine Intelligence, vol. 24, No. 11, Nov. (2002). Available at IEEE Xplore.*

(Continued)

*Primary Examiner* — Neveen Abel-Jalil
*Assistant Examiner* — Daniel Kinsaul
(74) *Attorney, Agent, or Firm* — Shook, Hardy & Bacon L.L.P.

(57) ABSTRACT

Systems and methods for processing data transform a first data structure (e.g., a hierarchical data structure) into a second data structure (e.g., using a parsing system), wherein the second data structure includes a first set of leaf nodes under a first ancestor node (additional sets of leaf nodes and/or ancestor nodes also may be defined in the second data structure). One or more potential candidate nodes for the ancestor nodes may be identified based, at least in part, on the ancestor nodes from the first data structure associated with the leaf nodes grouped under the new ancestor nodes. In at least some examples, the leaf nodes grouped under a new ancestor node will "vote" for their original ancestor node, and the node receiving the most "votes," in at least some instances, will be reused as the corresponding ancestor node in the second data structure.

24 Claims, 13 Drawing Sheets

U.S. PATENT DOCUMENTS

| | | | |
|---|---|---|---|
| 6,711,585 B1* | 3/2004 | Copperman et al. | 1/1 |
| 6,714,939 B2* | 3/2004 | Saldanha et al. | 707/102 |
| 6,785,673 B1* | 8/2004 | Fernandez et al. | 1/1 |
| 2002/0073119 A1* | 6/2002 | Richard | 707/513 |
| 2002/0085002 A1 | 7/2002 | Lamping et al. | |
| 2002/0191452 A1 | 12/2002 | Fujihara | |
| 2003/0130976 A1* | 7/2003 | Au | 706/55 |
| 2003/0190074 A1* | 10/2003 | Loudon et al. | 382/187 |
| 2003/0215138 A1 | 11/2003 | Raghupathy et al. | |
| 2003/0215139 A1 | 11/2003 | Shilman et al. | |
| 2003/0215145 A1 | 11/2003 | Shilman et al. | |
| 2004/0088652 A1* | 5/2004 | Abe et al. | 715/513 |
| 2004/0260676 A1* | 12/2004 | Douglis et al. | 707/3 |
| 2005/0028091 A1* | 2/2005 | Bordawekar et al. | 715/514 |
| 2006/0050962 A1* | 3/2006 | Geiger et al. | 382/186 |

OTHER PUBLICATIONS

U.S. Appl. No. 10/646,472 as filed on Aug. 21, 2003 (Richard Duncan, et al.).

U.S. Appl. No. 10/646,474 as filed on Aug. 21, 2003 (Richard Duncan, et al.).

U.S. Appl. No. 10/646,473 as filed on Aug. 21, 2003 (Richard Duncan, et al.).

U.S. Appl. No. 10/644,900 as filed on Aug. 21, 2003 (Richard Duncan, et al.).

* cited by examiner

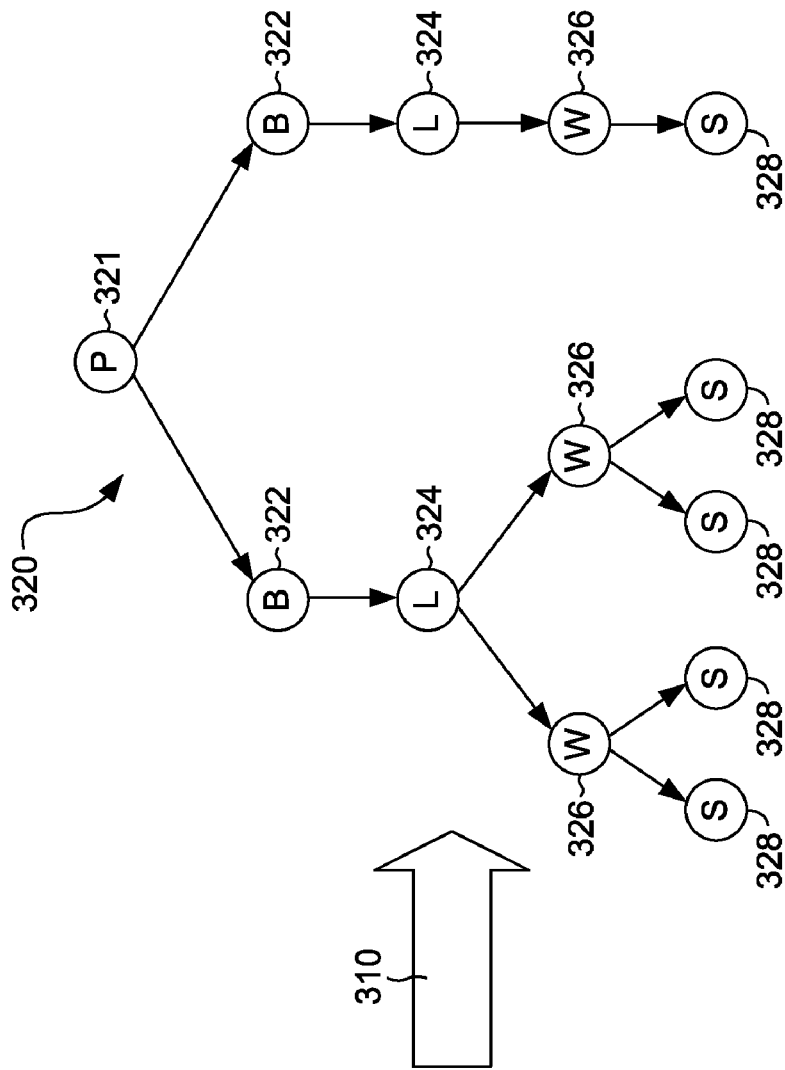
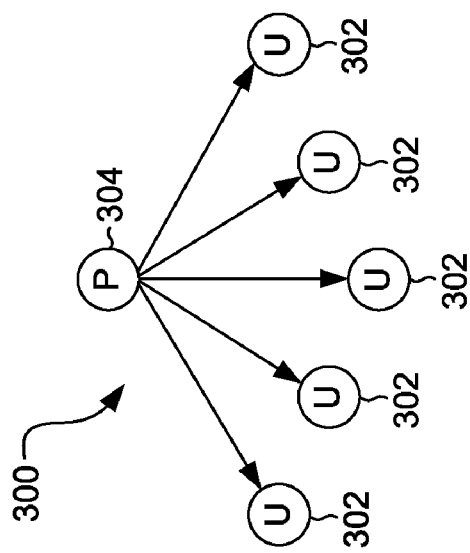
FIG. 3

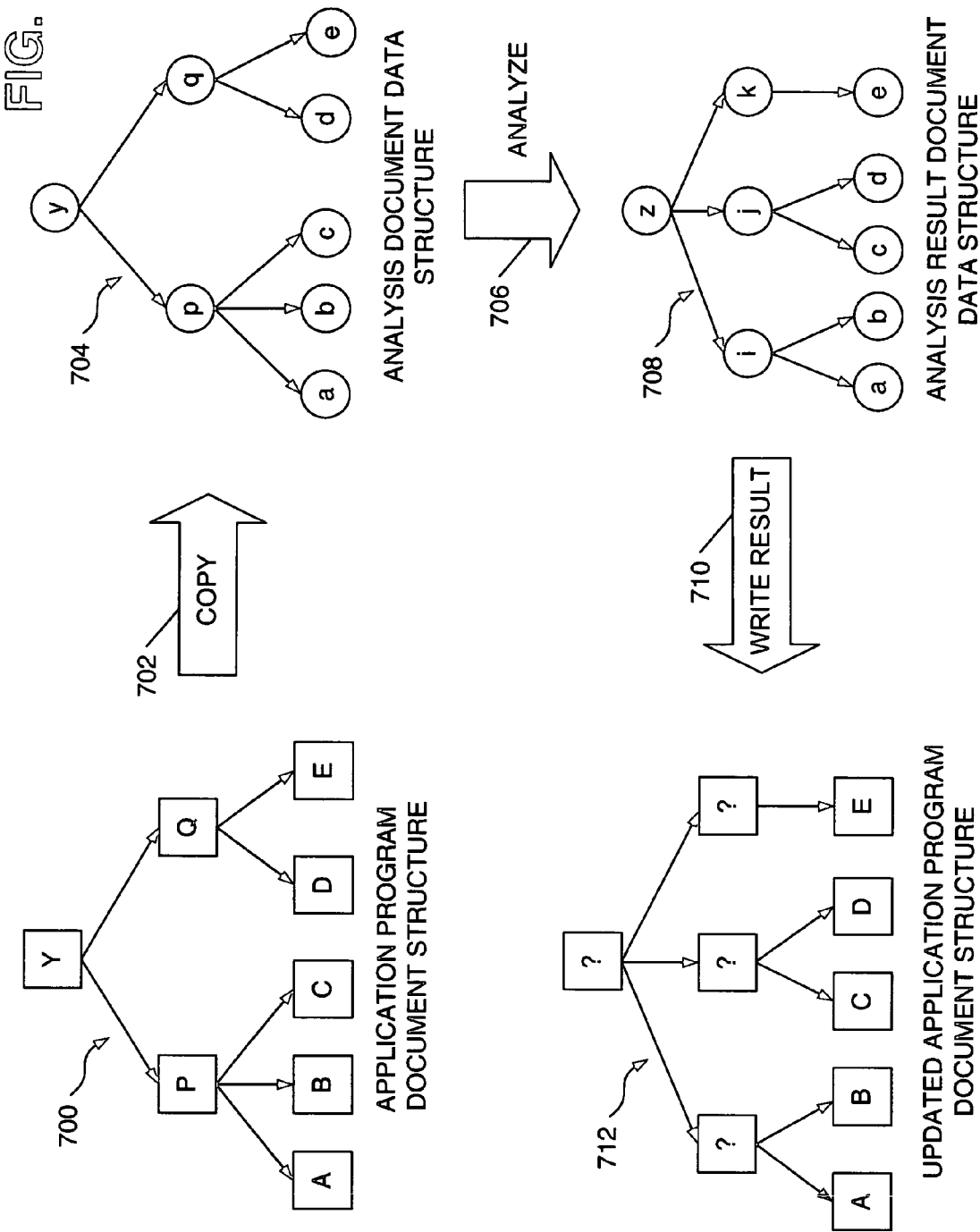

FIG. 7B
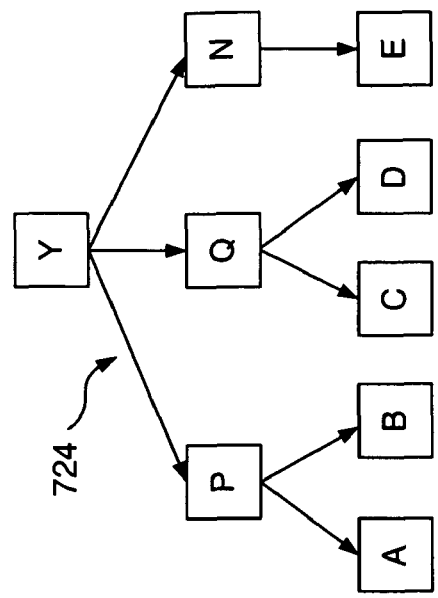
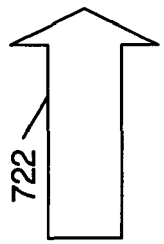
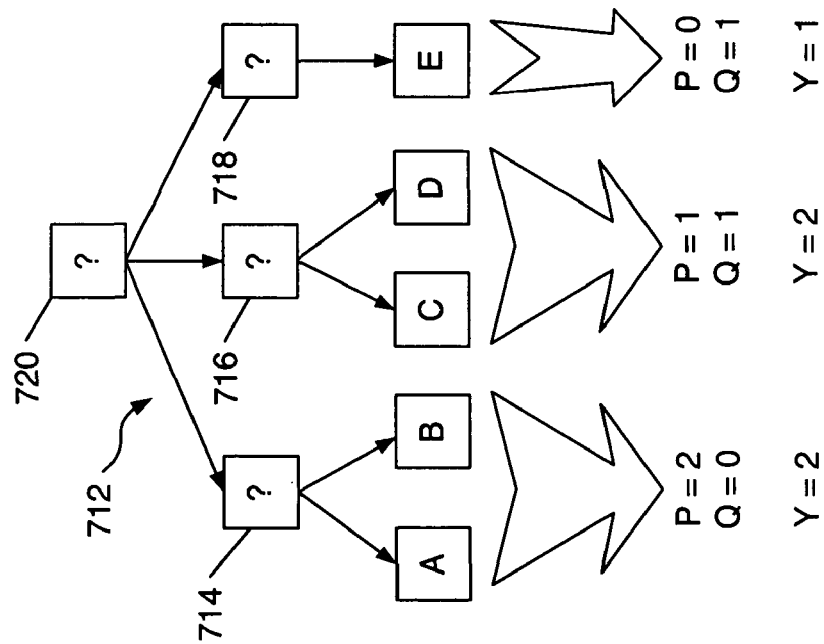

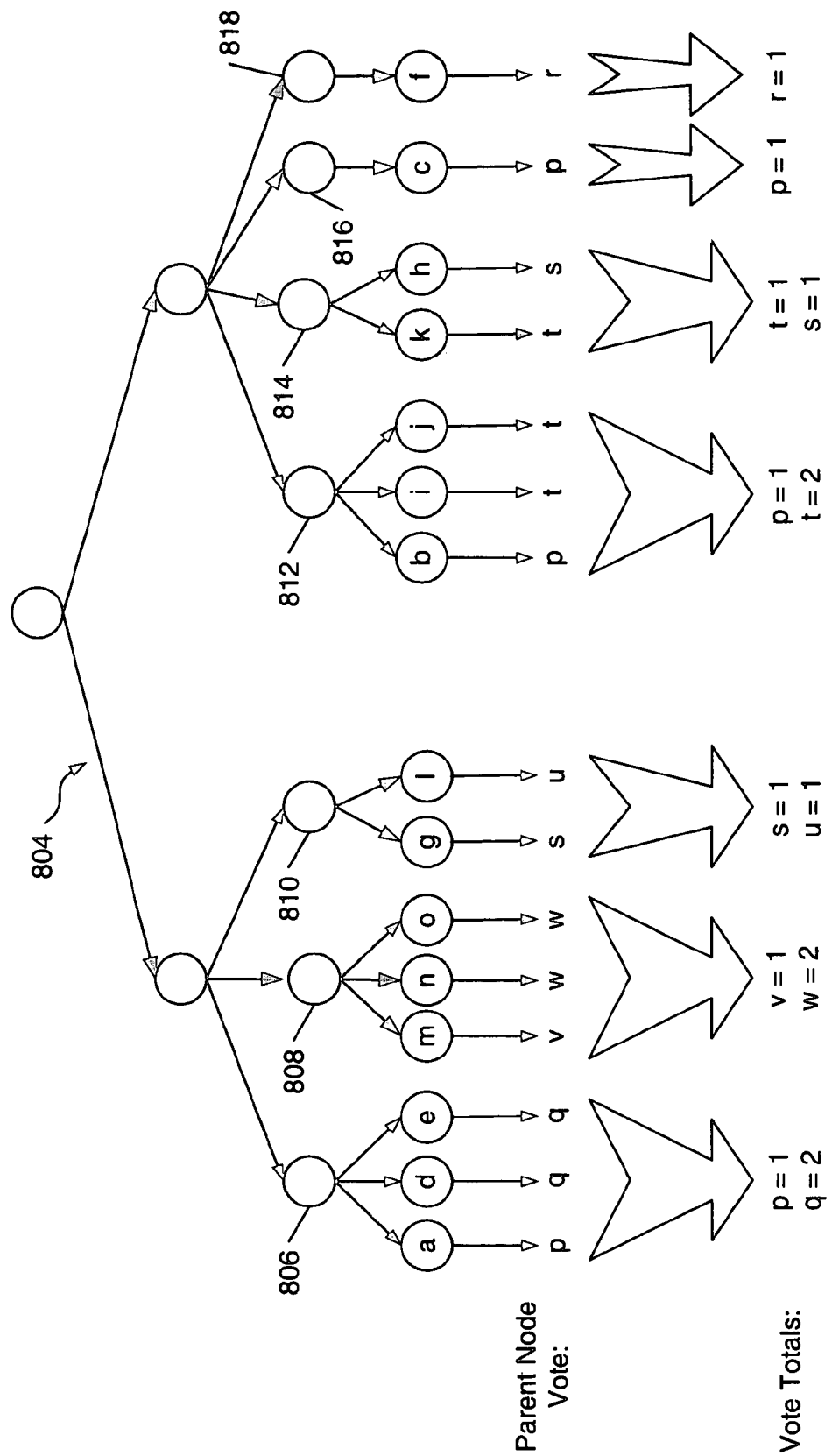

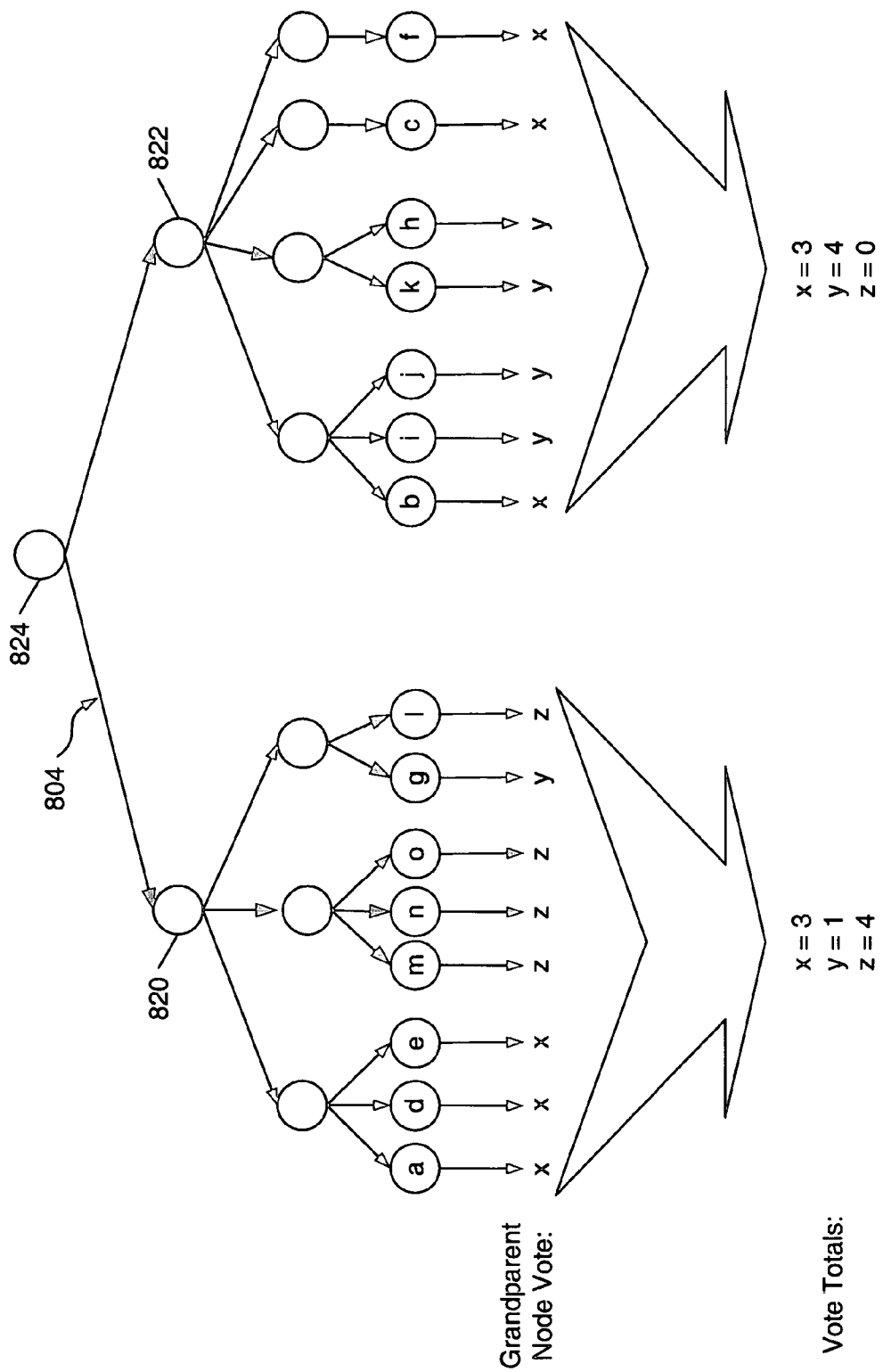

VOTING BASED SCHEME FOR ELECTRONIC DOCUMENT NODE REUSE

FIELD OF THE INVENTION

The present invention generally relates to systems, methods, and computer-readable media for processing electronic ink data and/or other data, e.g., in pen-based computing systems.

BACKGROUND

Typical computer systems, especially computer systems using graphical user interfaces ("GUIs"), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, e-mails, web pages, and the like.

Recently, however, pen-based computing systems, such as tablet PCs and the like, have been increasing in popularity. In pen-based computing systems, user input advantageously may be introduced using an electronic "pen" or stylus (e.g., akin to writing with a pen or pencil on a piece of paper). Indeed, in at least some pen-based computing systems, all user input is capable of being entered and manipulated using an electronic pen input device, and the user interface is fully controllable using only the electronic pen.

As pen-based computing systems become more popular, users are increasingly entering more data in the form of electronic ink. In many instances, users may wish to convert the original electronic ink data to machine-generated text, i.e., text suitable for storage, use, and manipulation by conventional word processing programs and other application programs. Handwriting recognition programs and other electronic ink analysis programs are available to enable more versatile use and availability of electronic ink data.

Analyzing input electronic ink data, e.g., for handwriting recognition purposes or the like, can take considerable computer processing time, particularly when a large volume of data must be analyzed (e.g., a long or complex document). Accordingly, in at least some instances, in order to minimize or reduce the time that an electronic document is unavailable to an end user (e.g., for data entry purposes), this type of recognition or other analysis may take place in a background thread, e.g., on a copy of the electronic document, so that the original electronic document in the application program may remain available to the user for further data entry. Moreover, in at least some instances, the background analysis (e.g., the handwriting recognition or the like) is repeated periodically and incrementally on copies of the electronic document, while the user continues working with the original electronic document in the application program, to minimize or reduce the volume of unprocessed input data at any given time. Through this periodic and incremental analysis, the analysis builds on and/or starts from previously obtained analysis results.

In order to perform processing on copies of electronic documents, e.g., in a background thread and incrementally, as generally described above, data must be periodically moved from the copy on which the analysis is performed to the original electronic document in the application program on which the user is working. In some instances, data associated with or maintained by the original application program document can be lost during these data moving operations. Additionally, users can experience processing delays when the original electronic document is replaced by the copy on which an analysis has been performed, particularly when the electronic document is long or complex and/or when all or a large portion of the electronic document must be written into the application program. Such data loss and processing delays can be frustrating to users, and they can pose barriers to adoption of pen-based computing systems.

Accordingly, there is a need in the art for systems, methods, and computer-readable media that enable rapid and accurate evaluation of one electronic document or data structure as compared to another so as to preserve and maintain data associated with the original electronic document or data structure and/or to reduce the processing time associated with rewriting and/or copying data from one document or data structure to the other.

SUMMARY

Aspects of the present invention relate to systems and methods for processing electronic ink data and/or other data. Such systems and methods may include or utilize a memory for storing a first data structure (e.g., a hierarchical data structure corresponding to or based on an original electronic document containing electronic ink data, e.g., in an application program). The systems and methods according to at least some examples of the invention further may copy and/or transform data from the first data structure to a second data structure (e.g., a data structure used in a text or electronic ink parsing system or program), wherein the second data structure includes at least a first set of leaf nodes (e.g., nodes corresponding to ink stroke data) grouped together under a first ancestor node (e.g. a parent node). Additional sets of leaf nodes and/or ancestor nodes also may be defined in the second data structure. The processor further may identify one or more potential candidate nodes for the various ancestor nodes in the second data structure based, at least in part, on the ancestor nodes from the first data structure associated with the leaf nodes grouped under the respective ancestor node(s) in the second data structure. In at least some examples of the invention, the leaf nodes grouped under a specific ancestor node in the second data structure may be thought of as "voting" for an ancestor node (based on their ancestor node present in the original document data structure and/or in the first data structure), and the ancestor node receiving the most "votes," in at least some instances, will be used as the ancestor node in the second data structure. Optionally, the determination of the appropriate ancestor nodes may take into consideration other factors, such as properties on a node, number of votes received by other potential ancestor nodes, the usefulness of the potential ancestor node at other locations in the second data structure, and the like. Additional aspects of the invention relate to computer-readable media including computer-executable instructions stored thereon for performing various methods and/or operating various systems, including systems and methods like those described above.

BRIEF DESCRIPTION OF THE DRAWINGS

The above and other objects, features, and advantages of the present invention will be more readily apparent and more fully understood from the following detailed description, taken in conjunction with the appended drawings, in which:

FIGS. 3 through 5 illustrate examples of systems and methods in which examples of the processing and/or analysis according to aspects of the present invention may be used; and FIGS. 6A through 8D illustrate examples of processing and analysis that may take place in at least some examples of systems and methods of the present invention to allow node data and/or node information to be reused.

When the same reference number is used in more than one of the attached drawings, it is intended to refer to the same or similar parts, features, data, or steps in the various different drawings.

DETAILED DESCRIPTION

Figure 1:
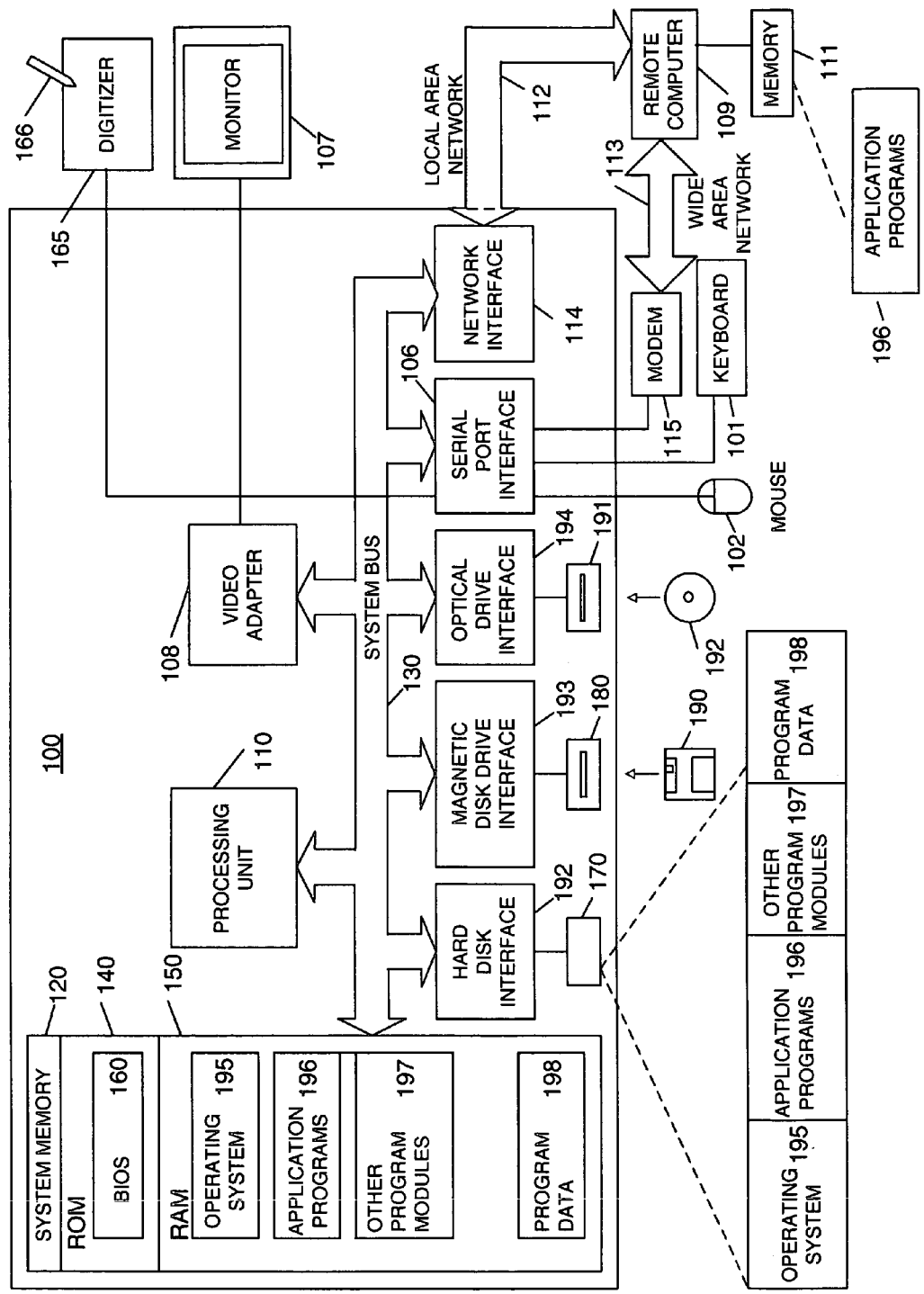
FIG. 1 illustrates a schematic diagram of a general-purpose digital computing environment in which certain aspects of the present invention may be implemented.

As described above, aspects of the present invention relate to systems, methods, and computer-readable media for processing electronic ink data and/or other data, e.g., in pen-based computing systems. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. TERMS

The following terms are used in this specification and, unless otherwise specified or clear from the context, the terms have the meanings provided below:

"Pen"—Any type of user input device useful in entering electronic ink into and/or otherwise manipulating or controlling an electronic document, a user interface, and/or a computer operating system. The terms "pen" and "stylus" may be used interchangeably in this specification.

"Pen-Down Event"—An event that is initiated at the time a pen contacts a digitizer. Typically, a pen-down event will end at the time the pen leaves the digitizer surface (also called a "pen-up event" in this specification). Electronic ink data may be collected based on movement of a pen between a pen-down event and a pen-up event, e.g., as an ink stroke or in other conventional manners as are known in the art.

A "set," as used herein, may include any number of members, including zero and one. For example, a "set of leaf nodes," as used in this specification, may contain zero, one, or more leaf nodes.

"Computer-Readable Medium" means any available media that can be accessed by a user on a computer system. By way of example, and not limitation, "computer-readable media" may include computer storage media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. Combinations of any of the above should also be included within the scope of "computer-readable media."

II. GENERAL DESCRIPTION OF VARIOUS ASPECTS OF THE INVENTION

Aspects of the present invention relate to systems and methods for processing electronic ink data and/or other data. Such systems and methods may include or utilize a memory for storing a first data structure (e.g., a hierarchical data structure corresponding to or based on an original electronic document containing electronic ink data, such as data stored in an application program). Systems and methods according to at least some examples of the invention further may copy and transform data from the first data structure to a second data structure (e.g., using a computer processor), wherein the second data structure includes at least a first set of leaf nodes under a first ancestor node (in at least some examples, the first data structure may remain available to the user, e.g., for new data entry). The processor further may identify one or more potential candidate nodes for the first ancestor node of the second data structure based, at least in part, on ancestor nodes from the first data structure associated with the leaf nodes in the first set. In at least some examples, the leaf nodes may contain data corresponding to one or more electronic ink strokes, or portions of one or more ink strokes.

In at least some examples of the invention, the second data structure additionally will include at least a second set of leaf nodes under a second ancestor node. The processor further may identify one or more potential candidate nodes for this second ancestor node based, at least in part, on ancestor nodes from the first data structure associated with the leaf nodes in the second set. Any number of ancestor nodes and sets of leaf nodes may be included in the second data structure without departing from the invention (e.g., depending on the content and/or arrangement of the electronic document).

Various factors may be taken into consideration when determining the best or most appropriate candidate node to assign as one of the ancestor nodes in the second data structure. For example, the first ancestor node may be assigned based, at least in part, on the potential candidate node most often identified as associated with the leaf nodes in the first set (e.g., the potential candidate node receiving the most "votes" as the ancestor node from the leaf nodes under the first ancestor node in the first set). If ancestor nodes are not to be reused multiple times in the second data structure, the second ancestor node may be assigned based on the potential candidate node most often identified as associated with the leaf nodes in the second set unless that potential candidate node is the same as the potential candidate node most often identified as associated with the leaf nodes in the first set. In that case, the second ancestor node may be assigned as the potential candidate node second most often identified as associated with the leaf nodes in the second set. As another alternative, in this situation, a new node may be created for the second ancestor node. As still another alternative, the determination as to which potential candidate node to assign as the first ancestor node and which potential candidate node to assign as the second ancestor node may be based, at least in part, on a determination of which arrangement of potential candidate nodes will reduce the necessary data processing operations when converting an original document data structure to a form represented by the second data structure and/or on a determination of which arrangement of potential candidate nodes will best preserve and maintain the data present in the original electronic document. Other data or factors also may be taken into consideration when assigning or designating the ancestor node values.

When assigning node values in accordance with aspects of the invention, the node values may be assigned at specific hierarchical levels. For example, node value determinations may be made at a great-grandparent level (if any), then at the grandparent level (if any), and then at the immediate parent level. The term "ancestor node" generically covers all hierarchical levels of a data structure above the leaf node level.

As mentioned above, aspects of this invention may be utilized on electronic documents, such as electronic documents including electronic ink data (such as data collected using tablet PCs and the like). An application program running on the computer and accepting input data as electronic ink may maintain its own data structure (optionally in a hierarchical form, e.g., the "first data structure"), and it may send data to an analysis program or system, e.g., for electronic ink parsing, handwriting recognition, and the like, e.g., which may revise the data structure to form the "second data structure." Alternatively, the analysis program or system may create the first data structure (e.g., a hierarchical data structure) based on the original electronic document's data structure. After the analysis to create the second data structure in the analysis program or system (e.g., by rearranging or reorganizing aspects of the first data structure), a revised document data structure may be created, e.g., in the application program based on the second data structure and the various assigned potential candidate nodes. By identifying potential candidate nodes from the original document data structure for reuse in the revised document data structure, data processing, writing time, and the like may be reduced when the revised document data structure is prepared and/or the original data may be maintained, to at least some degree, when the revised document data structure is prepared.

Aspects of the invention also relate to computer-readable media including computer-executable instructions stored thereon for performing various methods and/or operating various systems, including systems and methods like those described above.

III. EXAMPLE HARDWARE

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
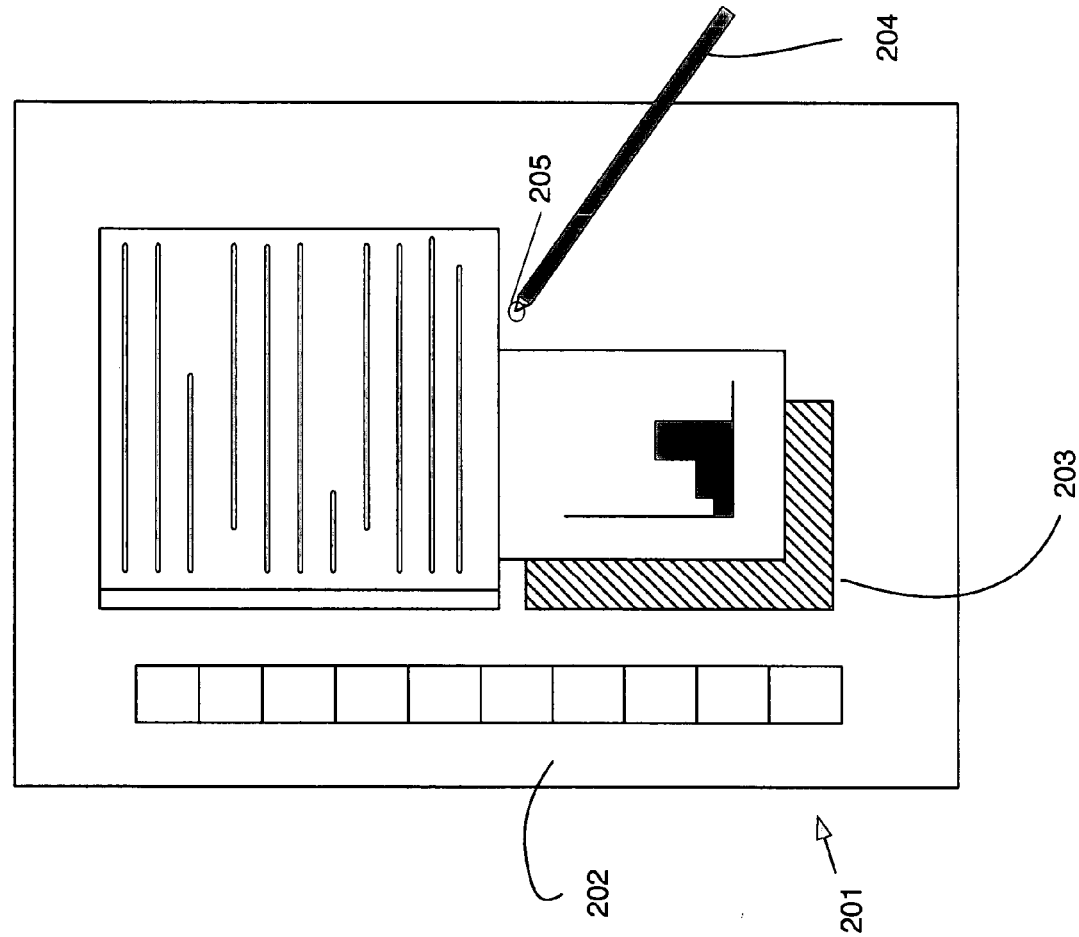
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area and thereby enter electronic ink data into the system. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, also may be used. The pen-based computing system 201 interprets gestures made using stylus 204 in order to manipulate data, enter text as electronic ink, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen," in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of component object model ("COM") services that an operating system and/or an application program can use to capture, manipulate, and store ink and/or other pen actions or events. The ink platform also may include a mark-up language including a language like the extensible markup language ("XML"). Additional examples of the ink platform may use the distributed component object model ("DCOM") implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or that accept, process, or display electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus or that can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

IV. EXAMPLE SYSTEMS, METHODS, AND COMPUTER-READABLE MEDIA ACCORDING TO THE INVENTION

A. Example of Systems Useful with Aspects of this Invention

FIG. 3 is a diagram that generally illustrates example data structures and the manner in which input data to a computer system may be processed and handled in at least some systems and methods according to the invention. In this illustrated example, the incoming data constitutes electronic ink data (e.g., data structures for storing information relating to an electronic document containing electronic ink data and/or a data structure used by a text and/or electronic ink parsing system (described in more detail below), a handwriting recognizer, or other analysis system for processing ink data), although it may represent other input data without departing from the invention. As shown, when data originally is introduced into an electronic document, the data structure 300 for the document stores all of the incoming stroke data (identified at the left side of FIG. 3 by unclassified ink stroke nodes 302) as depending from a single parent or root node 304, which may correspond to the entire electronic document, a page of the electronic document, or some other suitable or desired selection or collection of electronic ink data.

At some time after its entry, the input data (including the unclassified input ink data 302), may be further processed, for example, to assist in handwriting recognition operations and/or to otherwise place the data in a form or format making it more versatile and usable in various application programs and the like. In the example illustrated in FIG. 3, the input data is sent to a parser, which may determine whether the ink strokes constitute text, drawings, etc. For textual input, the parser system or program rearranges the input data 300 to produce a revised data structure 320 (the process being generally represented by arrow 310 in FIG. 3). The revised data structure 320 provides additional information regarding the layout and distribution of the stored ink strokes. In this illustrated example, the input electronic ink data and/or other data is parsed into and stored as a hierarchical structure defined based on the relevant language model corresponding to the input text language. More specifically, in this example (e.g., useful for English and other Latin-based languages and the like), the input electronic ink text may be parsed and stored such that a page, document, or other selection 321 of electronic ink data may include one or more paragraphs or blocks 322 of associated ink data, each paragraph or block 322 may include one or more lines 324 of associated ink data, each line 324 may contain one or more words or character strings 326 of associated ink data, and each word or character string 326 may contain one or more individual strokes 328 of associated ink data (e.g., a stroke corresponding to the digitizer points of the table PC or the like encountered during movement of the electronic pen on the digitizer between a pen-down event and a pen-up event, or some other suitable or desired collection of electronic ink data). Notably, the number of strokes 328 in data structure 320 corresponds to the number of unclassified ink strokes 302 in data structure 300 such that data structure 320 constitutes a rearrangement and more detailed hierarchical representation of the original strokes 302.

Of course, the data structures 300 and 320 of FIG. 3 constitute merely examples of potential data structures and processing of electronic ink data or other data. Many variations and changes can be made to the specific data structures without departing from the invention. For example, the line nodes 324 may be omitted and/or replaced by nodes corresponding to sentences, in order to more closely track English or Latin-based language models. As another example, the data corresponding to the individual strokes may be stored, for example, as properties in the relevant word nodes 326, and the separate stroke nodes 328 then may be omitted. Data corresponding to the individual words may be stored in a serial fashion without the remaining hierarchical structure, in at least some examples of the invention. Many other variations and changes are possible without departing from the invention. Additionally, if desired, machine-generated text corresponding to the electronic ink text (e.g., text generated by a handwriting recognition engine) may share the same or a similar data structure to the electronic ink text, including, for example, the data structures shown in FIG. 3. Also, suitable data structures can be developed and applied to other language models and structures, including, for example, East Asian languages, etc.

Various types of information can be stored in the various data nodes 302, 304, 321, 322, 324, 326, and/or 328 in the data structures 300 and 320 without departing from the invention. For example, the various nodes may store information regarding the location of their corresponding element on the page or in the document, the ink or text color, the node creation time, the source of the data in the node, the last node edit time, and the like. Additional examples of data or information that may be stored or associated with a node, such as a word node 326, may include the text's language; its location on the page or in the document (optionally with respect to other nodes on the page or in the document); a global unique identifier (GUID) identifying the source of this word or text (e.g., a handwriting recognizer, a keyboard, an external source, the user, etc.); pointers to the previous word, the following word, the parent node that contains the word, any child or dependent nodes, etc.; a pointer to, an object, or a property containing the strokes or characters contained in the word; and the like. Additionally, a word node, like node 326, may maintain data, such as a property, including some or all of the potential alternatives generated by the recognition software when the electronic ink word was recognized. Optionally or alternatively, various other types of data can be stored in the various nodes without departing from the invention.

Figure 4:
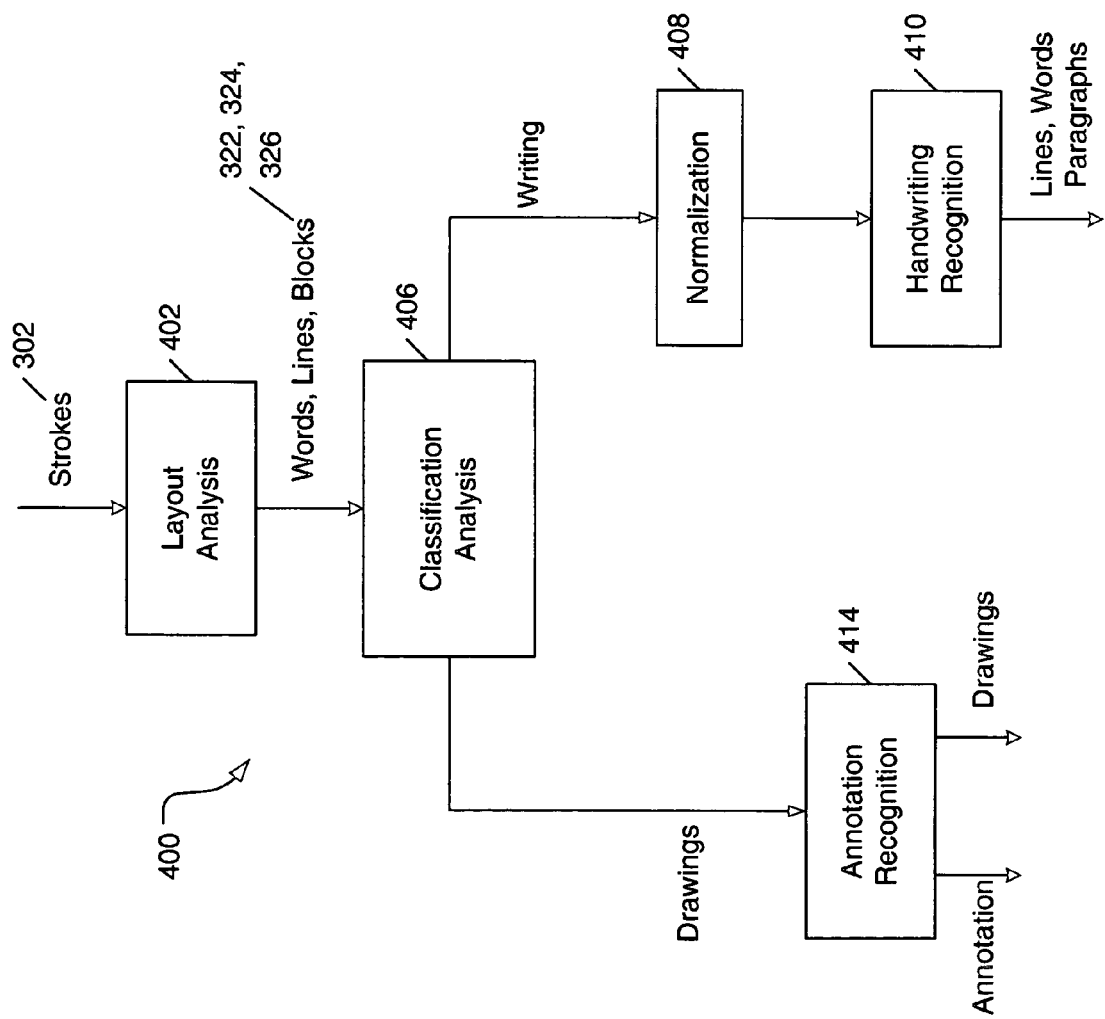

FIG. 4 is a diagram that illustrates an example of electronic ink input and processing 400 that may take place in systems and methods in accordance with at least some examples of this invention. As shown, incoming or input electronic ink strokes (e.g., unclassified ink data 302 from FIG. 3) first may be subjected to a layout analysis procedure 402, which combines, groups, and parses the individual input strokes 302 into associated sets of data, such as words 326, lines 324, blocks 322, and/or other groupings (e.g., as shown in FIG. 3). In general, the layout analysis method or engine 402 ascertains certain information relating to the layout of ink strokes 302 on a page, for example, based on the physical location of the strokes, lines, and the like on the page; the timing of input of the various strokes, lines and the like; the location of strokes, lines, and the like with respect to other strokes, lines, and the like; etc. Layout analysis of this type is known in the art, for example, as described in U.S. Published Patent Application No. 2003/0215139, which document is entirely incorporated herein by reference.

After layout analysis 402 (or at some other appropriate time in the processing procedure), the input and/or initially processed data may be introduced into a variety of additional ink analysis engines. In the example illustrated in FIG. 4, the data is next introduced to a classification analysis system or engine 406. The classification analysis system or engine 406, which may constitute part of the parser system, determines the type(s) of strokes included in the specific input data (e.g., whether individual strokes or stroke sets represent flow diagrams, freeform drawings, text, music, mathematics, charts, graphs, handwriting, etc.). Classification analysis systems of this type are known in the art, for example, like those described in U.S. Published Patent Application No. 2003/0215145, which document is entirely incorporated herein by reference. In other example systems and methods, a user may "inform" the system as to the type of strokes being input, e.g., by selecting or activating a "drawing mode," a "text mode," a "music mode," or the like, and this classification analysis system or engine 406 then may be omitted.

Further processing of the input ink may depend on the stroke type recognized by the classification analysis system or engine 406 (or otherwise determined). For example, for strokes or stroke sets that are classified as textual handwriting, the classified stroke sets may be sent to a handwriting recognition system 410 or another appropriate processing system. If necessary or desired, prior to introduction into the handwriting recognition system 410 or other processing system, the input ink data may be "normalized" using a normalization algorithm or system 408, to arrange or place the input ink data in an optimum orientation or format for analysis by the handwriting recognition system 410 or other processing system (e.g., to rotate the text to a horizontal base line, if necessary, and/or the like). Conventional normalization systems or methods 408 and/or handwriting recognition systems or methods 410 may be used without departing from the invention, for example, like the handwriting recognition system used in Microsoft Corporation's Windows XP Tablet PC Edition™ platform/operating system software. The data output from the handwriting recognition system or method 410 may constitute the actual machine-generated text (e.g., lines, words, paragraphs, etc.) usable in any conventional manner, such as in conventional word processing systems (e.g., Microsoft WORD® or the like), e-mail handling systems, etc. Alternatively, the output data may constitute and/or point to a memory location for the corresponding machine-generated text.

As another example, if the classification analysis engine 406 recognizes the input strokes or stroke sets as containing drawing strokes, the data then may be transferred to an annotation recognition system or method 414, which can be used to recognize textual information in the drawing. Further processing can proceed in any conventional manner. For example, if desired, the drawings may be "cleaned-up," wherein the handwritten annotations may be replaced with machine-generated text, handwritten drawing lines or shapes (e.g., circles, triangles, rectangles, lines, etc.) may be replaced with corresponding machine-generated elements, and the like. Also, the drawings (either the handwritten versions or later machine-generated versions) can be introduced into any suitable programs or systems without departing from this invention.

The classification analysis systems and methods 406 used in some examples of the invention also may recognize other specific writing or drawing types without departing from the invention. For example, a classification analysis system may recognize input stroke sets as containing music, mathematical information, tables, charts, graphs, flow diagrams, etc., without departing from the invention. Such stroke sets, if present and recognized (or otherwise determined), may be sent to more specialized recognition systems and/or to other suitable processing applications without departing from the invention (e.g., music recognizers, synthesizers, etc.).

Some or all of the functions described in conjunction with FIGS. 3 and 4 could be performed on input ink data after a user completely enters all ink onto the page or into the electronic document (e.g., upon a user's command, such as upon receiving a "save," "parse," "close," or "recognize" command). Because of the computer processing time required to perform typical layout analyses and handwriting recognition analyses, however, a user may experience significant delays if processing were conducted on this infrequent ad hoc basis. These delays may last long enough such that the user would become frustrated waiting for the computer system to complete its analyses before moving on to the next desired operations (e.g., entering more ink, moving on to a new page, printing, opening a new document or application program, closing a program, shutting down the computer, etc.).

Systems and methods according to examples of the present invention allow a computing system to perform various analyses, such as layout analysis 402, classification analysis 406, handwriting recognition analysis 410, etc., incrementally, in real time, while the user continues to use the computing system (e.g., to add new and/or to modify existing ink strokes on the page). Moreover, in at least some examples of systems and methods according to the invention, the various parser engines (like those described above in conjunction with FIG. 4) operate in a background thread, on a "snapshot" of the application program's data structure, in order to minimize or reduce the time that the application program's data structure is unavailable to the user for entering ink or other data (the term "application program's data structure," as used herein, means a data structure created and/or used in connection with operation and/or use of an application program).

Figure 5:
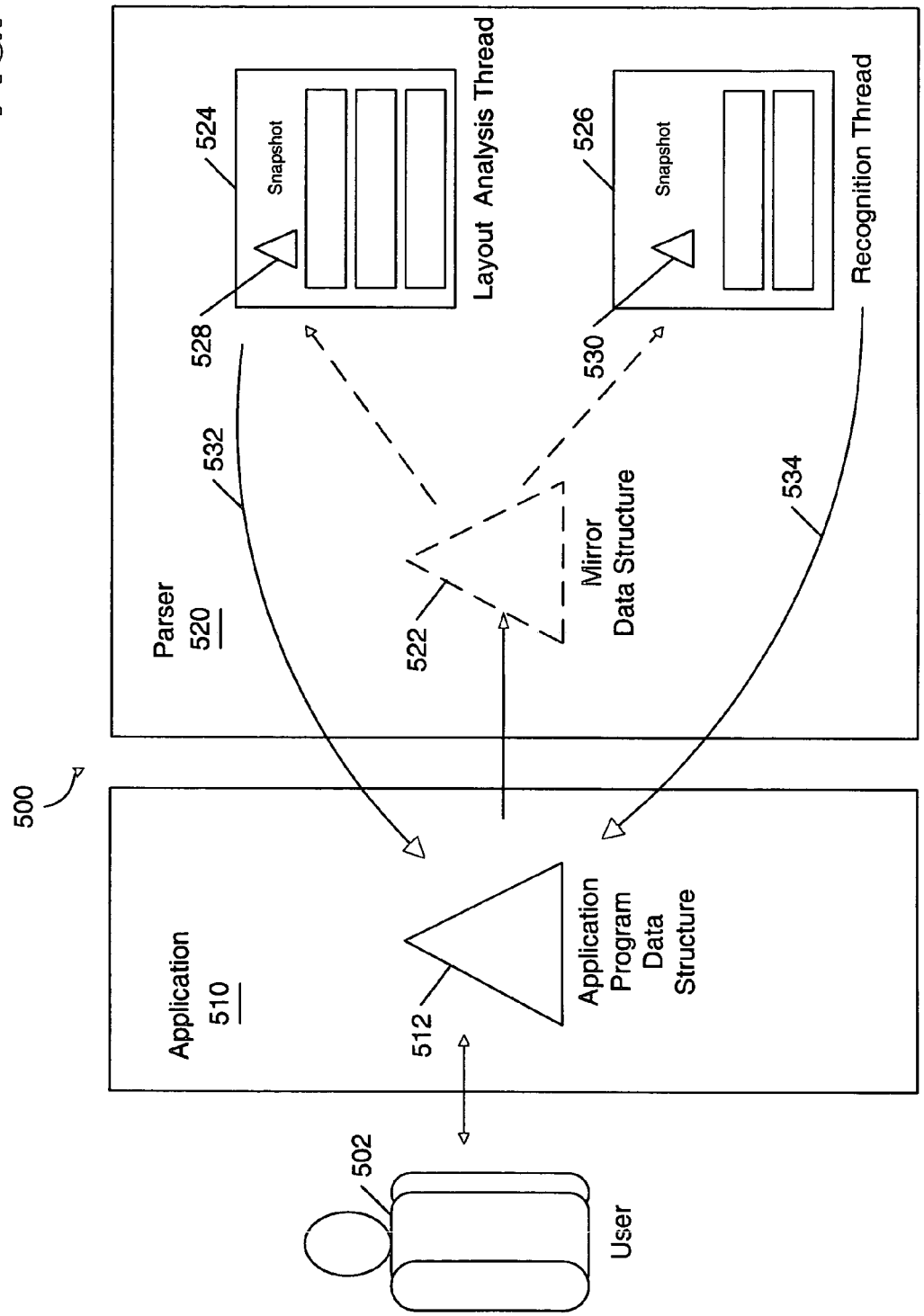

FIG. 5 illustrates a schematic diagram of one example of a system useful for practicing aspects of the present invention. While such a system is described in detail in U.S. Patent Publication No. 2003/0215138, which document is entirely incorporated herein by reference, it will be briefly described below. As illustrated, the overall system 500 includes an application system or program 510 for accepting input data (such as input electronic ink data). The overall system 500 may be operated on a pen-based computing system, e.g., like that illustrated and described in conjunction with FIG. 2. The user 502 enters ink strokes or other data into an application program 510 running on the system 500 (or the ink strokes or other data are downloaded, e.g., from memory or an external source), and the ink strokes are stored by the application program 510, for example, in an application program data structure 512 (which may be in the form of a hierarchical data structure 512, like that illustrated in FIG. 3). The input data (originally stored in data structure 512) may be sent to a parser 520, which processes the input data and provides a revised data structure, e.g., as illustrated in FIG. 3. So that the user 502 can continue to make modifications to the application program's data structure 512 while the parser 520 operates, the parser 520 contains a mirror data structure 522. Changes made to the application program's data structure 512 (e.g., by the user 502, the parser 520, from another source, etc.) are immediately passed on to the mirror data structure 522 so that the mirror data structure 522 generally "mirrors" the content of the application program's data structure 512.

The mirror data structure 522 is used to supply input data to the various analysis engines included as part of the parser 520. The parser 520 may be independent of the application program (e.g., part of the computer's operating system), or it may be part of the application program. In the example illustrated in FIG. 5, one analysis engine included in parser 520 is a layout analysis engine 524 (which may conduct, for example, a layout analysis 402 as described above in conjunction with FIGS. 3 and 4), and the other is a recognition engine 526 (which may conduct, for example, handwriting recognition analysis 410 and/or annotation recognition analysis 414, as described above in conjunction with FIG. 4). The engines 524 and 526 may receive "snapshots" 528 and 530, respectively, of the mirror data structure 522 as input data, and they operate on these "snapshots" 528 and 530 instead of operating directly on the application program's data structure 512 or the mirror data structure 522. In this manner, the user 502 can continue performing operations on the application program's data structure 512 while the various parser analysis engines 524 and 526 also operate, and the user 502 does not experience an interruption in operation (e.g., processing delays) as the engines 524 and 526 operate on the data. Additionally, use of the snapshots 528 and 530 allow the various analysis engines 524 and 526 to operate independently of one another, and it allows the mirror data structure 522 to stay in synchronization with the application program data structure 512.

Optionally, in at least some examples of systems and methods according to the invention, the mirror data structure 522 may be omitted, and the parser engines 524 and 526 may receive their "snapshots" 528 and 530, respectively, directly from the application program data structure 512 or from any other appropriate source. Due to its optional character, mirror data structure 522 is shown in broken lines in FIG. 5.

The output of the parser engines 524 and/or 526 may be modified or revised data structures and/or it may be data used to provide modified or revised data structures in the application program. For example, if the layout analysis engine 524 is like that described in conjunction with FIG. 3, the output of layout analysis engine 524 may be a data structure that includes individual ink strokes grouped into associated words, lines, blocks, and the like. Similarly, if the parser engine 526 is a handwriting recognition system, the output may include information or a data structure corresponding or linked to machine-generated text generated based on the original ink strokes.

When the parser engines 524 and 526 complete their operations on the snapshot input data 528 and 530, respectively, the resulting data and/or information is sent back to the application program 510, as indicated by arrows 532 and 534, respectively. As noted above, however, the user 502 may make changes to the application program's data structure 512 during the time period that the parser engines 524 and/or 526 operate on the snapshots 528 and/or 530. Therefore, before writing the parser analysis engine results back to the application program's data structure 512, the parser 520 compares the application program's data structure 512 (including any user made changes) to the revised data structure(s) sent or defined by the parser engines 524 and/or 526, optionally using the mirror data structure 522 (if any). If the user 502 made changes to the application program's data structure 512 that are not reflected in the revised data structure(s) from the parser engines 524 and/or 526, or if user-made changes to the application program's data structure 512 render moot or conflict with changes to the data structure(s) made by the parser engines 524 and/or 526 (e.g., by adding, deleting, or modifying strokes), then the application program's data structure 512 is revised only to include the changes made by the parser analysis engines that do not conflict with the user-made changes (user-made changes override parser-made changes). Also, in at least some instances, only portions of the application program's data structure 512 modified from the existing version need to be changed or rewritten, in order to reduce data writing time (and the associated interruption experienced by the user 502). In this manner, the finally revised application program data structure 512 will include all changes made by the user 502 and the results of the previous parser engine analyses, to the extent that the parser engines made changes that are not inconsistent with or trumped by user made changes. An example of systems and/or methods for reconciling changes in data structures from different sources in this manner can be found, for example, in U.S. patent application Ser. No. 10/646,472 filed Aug. 21, 2003, which application is entirely incorporated herein by reference. Aspects of the present invention relate to determining which portions of the application program's data structure 512 can be reused as part of the revised application program data structure in order to preserve and maintain data associated with the application program's data structure, if possible, and/or to minimize or reduce data writing time when producing the revised application program data structure.

Because the application program's data structure 512 contains shared data ultimately modifiable by the user 502 as well as the parser engines 524 and 526, the user 502 cannot input new data into the application program's data structure 512 while it is being rewritten to include the parser-made changes. If a user 502 attempts to do so, such systems and methods can handle these attempts in any suitable manner. For example, the new strokes or attempted changes may be ignored, or they may be stored in a temporary buffer memory until the revised application program data structure is available for data input. However, because the application program data structure 512 according to this example of the invention generally is unavailable only during the time the system rewrites the changed portions of the data structure, and because steps are taken to reduce or minimize this data rewriting time in accordance with aspects of the present invention, the unavailable time period typically is quite short, and often unnoticed by the user.

Once the application program's data structure 512 is rewritten or modified (including the user and/or parser engine made changes), the mirror data structure 522, if present, is updated to mirror the rewritten or modified application program data structure 512, and the parser engines 524 and 526 can again conduct their analyses (if necessary). Operation of an incremental analysis system of this general type is described in more detail in U.S. Patent Publication No. 2003/0215138. Aspects of the present invention also can be used to reduce or minimize the rewriting time associated with modifying the mirror data structure 522 and/or the snapshots 528 and 530. Also, in at least some examples of the invention, the parser engines 524 and/or 526 may operate only on portions of the application program's data structure 512 that have been recently modified (and any portions affected by the recent modifications), to further reduce processing time. By incrementally updating the parser engine operations and the associated data structures at the same time the user inputs data, the parser 520 can generally maintain its operations relatively up to date with respect to the user's data entry, thereby minimizing or reducing processing delays observed by the user.

Many variations in the system 500 are possible without departing from the invention, and the system 500 illustrated in FIG. 5 is merely one example of a suitable system. For example, as mentioned above, if desired, the mirror data structure 522 may be omitted, and the system could operate using only the application program data structure 512 and the snapshot(s) 528 and/or 530 used in the various parser stages. One example of such a system is that described in U.S. patent application Ser. No. 10/646,472, noted above. Other modifications and/or changes also are possible.

B. General Description of Aspects of the Invention

A general description of an example algorithm useful in at least some example systems and methods according to this invention follows.

When an internal data structure is created in an analysis system or method (such as a parsing system) to reflect a document structure from an application program, the algorithm according to this example of the invention keeps track of the original electronic document's nodes (from the application program's document data structure) and may represent these nodes by corresponding nodes in the analysis system's internal data structure. After the analysis is completed and the analysis results are reflected in a revised data structure, for every non-leaf node in the revised data structure (e.g., the ancestor nodes), systems and methods according to at least some examples of this invention tally "votes" for various candidate document nodes from the original application program's data structure for reuse as nodes in the analysis result data structure. Each leaf node contributes one vote for its original ancestor node as a candidate for its corresponding ancestor node in the revised application program data structure. The candidate node receiving the most "votes" at a given node location for the revised data structure then is selected, at least a starting point, for reuse when applying the analysis results to and/or rewriting the application program's document data structure (optionally, subject to certain conditions and limitations described in more detail below).

In at least some examples of systems and methods according to the invention, when reusing document elements and rewriting the application program data structure to include the analysis results, the number of reorganization operation steps used during the writing and/or reorganization operations will be kept as low as practical, to reduce data writing and computer processing time. The following main types of operations can be performed on document nodes during data rewriting or reorganization in at least some examples of this invention:

(A) Move a child node to position "i" (e.g., to any selected position within its parent node's ordered list of child nodes).
(B) Append a new node as a child to a parent node (e.g., add a child node as the last node of an existing parent node).
(C) Delete a child node from a parent node.
(D) Reparent a child node from one parent node to another (optionally, this also can be accomplished by deleting a child node from its current parent and creating a new child node on the destination node (and optionally moving the new child node to another position on its parent node, if necessary)).

(E) Modify the properties and/or other data associated with a document node.

An element reuse algorithm according to at least some examples of this invention uses a recursive voting scheme. As a more specific example, each leaf node in the document data structure contributes one vote for its original parent node (from the original document data structure), and (in general, with some exceptions described in more detail below) the original parent node receiving the largest number of votes at a given node in the revised document data structure is reused in creating the revised data structure at that node. Additional constraints or information can be used, if desired, to select the best original node for reuse from the candidate lists. For example, a particular node type can be reused preferentially when its type is compatible with a corresponding node in the revised data structure (e.g., an ink drawing element can be reused preferentially as an annotation node in the revised data structure whereas a line or paragraph node would not be compatible at this position).

In at least some examples of the invention, an algorithm for operating the system or performing the method may be divided into two phases as follows:

Phase 1—Recursively calculate possible candidate document nodes for each node in the revised data structure (this may be accomplished in a "bottom-up" fashion when the data structure has a hierarchical structure as described above).

Phase 2—Recursively traverse the analyzed document data structure in a top-down, left-to-right manner, to decide which original node to reuse, and write the result using that original node (at least as a starting point for the data rewrite process).

These example phases are described in more detail below.

In Phase 1, for given a node, candidate identification and determination may be accomplished, for example, as shown by the pseudo code below:

Calculate Candidates for Node n
 1. If node n is a parent of leaf nodes then:
    a. Return the candidate list of potential parent nodes constructed by tallying all the original parent nodes of every child node in the new data structure. Each leaf node contributes one vote for the parent node based on its parent node in the original data structure.
 2. Otherwise:
    a. Recursively calculate the candidate for every child node.
    b. For each vote cast to a candidate for the child, a vote is tallied for the parent node of the candidate.

In Phase 2, once a candidate list of potential nodes has been determined for each node in the data structure, then the writing of the analysis result to the application program's data structure may be accomplished, for example, by the pseudo code described below:

Write the Analysis Program's Data Structure t to the Application Program's Data Structure d
 1. Create a list of all used original electronic document nodes (to keep track of which nodes already have been reused, to avoid double re-use (this list initially will be empty)).
 2. Select the best candidate for t's root node (which may be the original application program data structure's root, i.e., d's root). Name this as r.
 3. Write t's root to r.

Write the Analysis Program's node n to the Applicant Program's Electronic Document Node e
 1. Mark node e as used (e.g., put it on the used node list created above).
 2. Propagate all necessary properties of n to e.
 3. For every child node c of n do the following:
    a. Find the best candidate to reuse for node c:
       i. Select one unused node listed in the candidate list of c that has the most votes and/or matched properties
       ii. If none exist, then create a new child node of e (no reuse is possible)
       iii. Name this new node ec.
    b. Recursively write c to ec.

More detailed examples of use of systems and methods according to some examples of the invention follow.

C. Detailed Description of Aspects of the Invention

Figure 6A:
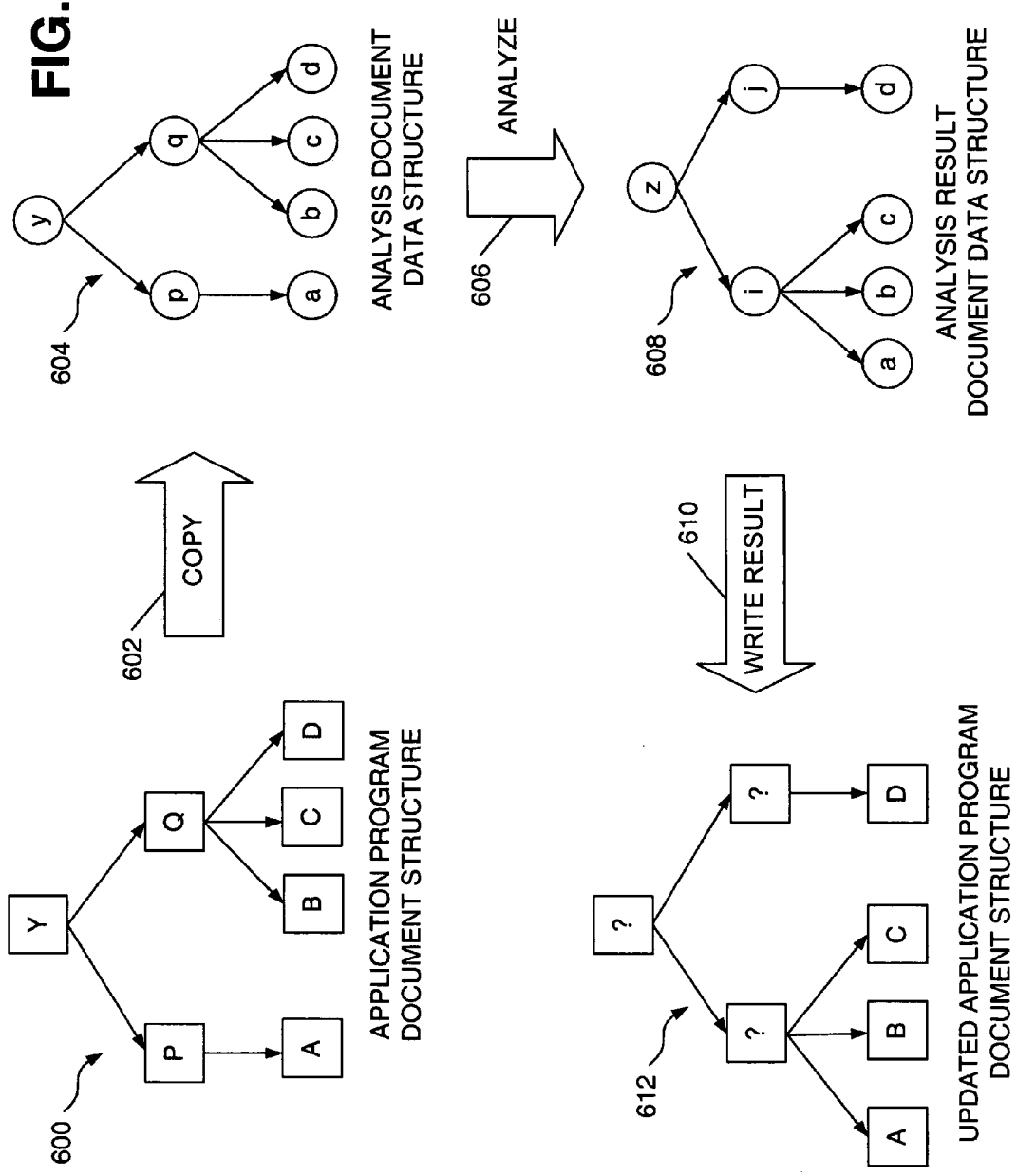
Figure 6B:
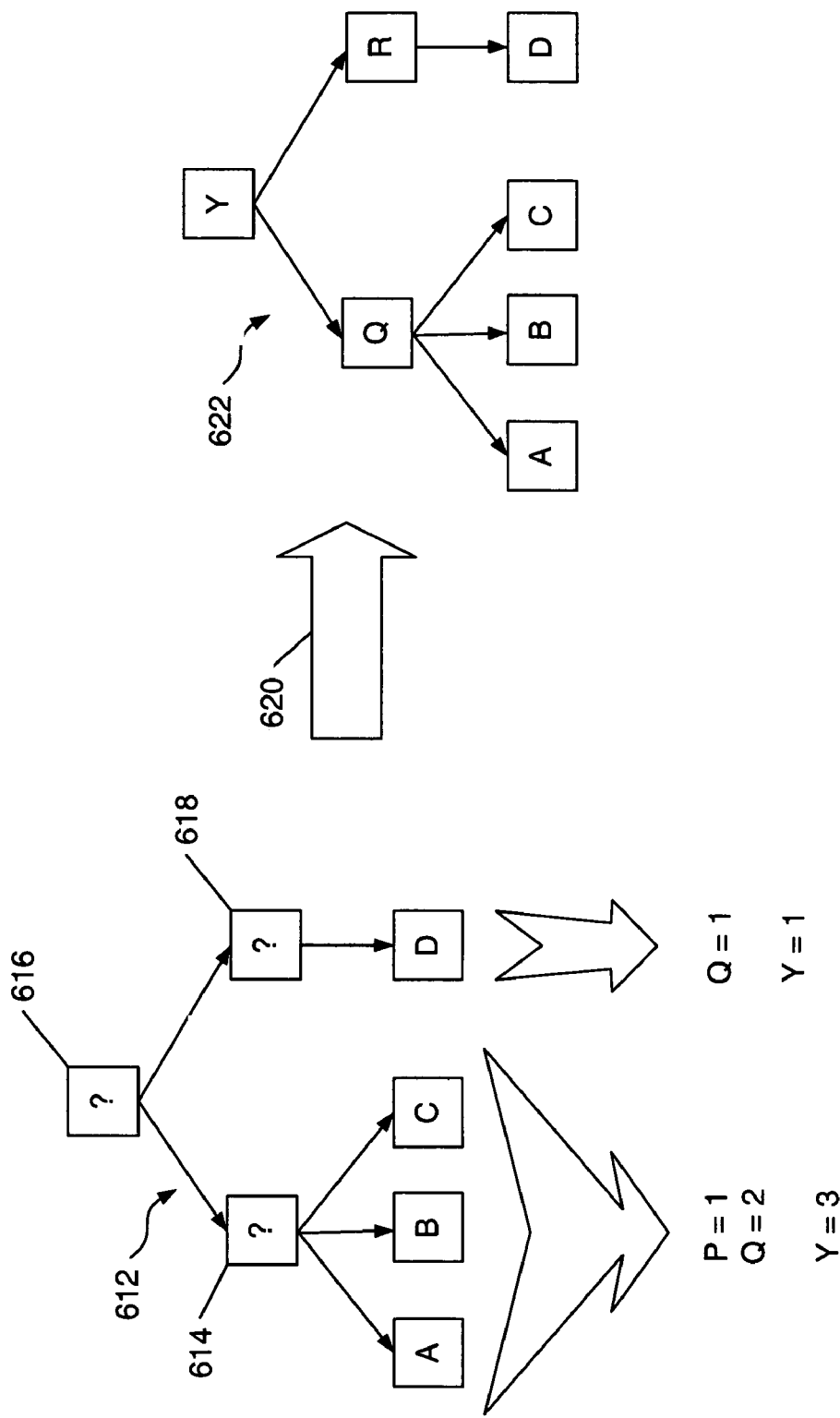

FIGS. 6A and 6B illustrate an example of processing that may occur in systems and methods according to at least some examples of this invention. As illustrated, when the procedure begins in systems and methods according to this example, an application program (e.g., like application program 510 in FIG. 5) has data stored in an electronic document data structure 600 (e.g., like application program data structure 512 of FIG. 5). At the start in this example, this data structure 600 includes a root node Y, which has two groups of data associated therewith (nodes P and Q, in this example). Node P has a single node of data dependent therefrom (node A), and node Q has three nodes of data dependent therefrom (nodes B, C, and D). As described above in conjunction with FIG. 3, this data may constitute electronic ink data, nodes P and Q may constitute lines of handwritten text or other groupings of data, and nodes A, B, C, and D may constitute text words or other associated groupings of data.

During processing, the data may be copied for use by a parser or other data processor or analysis system (e.g., to produce mirror document structure 522 or the snapshots 528 and 530 in parser 520 of FIG. 5). This is illustrated in FIG. 6A by arrow 602. The data structure 604 used in the analysis system of this example generally has the same hierarchical structure as that used in the application program. Of course, it is not a requirement that the application program's data structure 600 exactly correspond to the analysis system's data structure 604. Rather, if desired, the data structure 600 could be modified during the copying or in a preliminary step, e.g., while writing the data structure 604 in the analysis system. Even if both data structures contain the same general hierarchical structure, there is no requirement that the various nodes Y, P, Q, A, B, C, and D in data structure 600 store the exact same data or data in the same format as that stored in nodes y, p, q, a, b, c, and d of data structure 604. For example, the analysis system may require certain types of information to perform some of its functions (e.g., to analyze efficiently), and some of this additional information may not be relevant or useful to the application program (and hence not stored by the application program). Likewise, the application program may maintain and use data that is not used by or relevant to the analysis system. Also, because the parser or analysis system may need to operate with many different application programs having various different internal data structures, data written in or maintained in the analysis system may be different from, and indeed independent from, at least in some aspects, the data in the application program's data structure. There is no requirement that the application program's data structure and the analysis system's data structure be identical.

Next, the parser or other analysis system performs its operations on the incoming data (arrow 606 in FIG. 6A). This analysis may be, for example, a layout analysis 524 or handwriting recognition analysis 526, as illustrated in the example system of FIG. 5. As illustrated in FIG. 6A, this analysis may result in a new electronic document data structure that, in at least some instances, constitutes a re-organization or a rearrangement of the leaf nodes (nodes a, b, c, and d) of the original data structure 604 into an analysis result data structure 608 having a different structure. In the present example, leaf nodes a, b, and c now are grouped together and stored under a new parent node (node i), and leaf node d now is separately stored under a new parent node, node j. The parent nodes i and j are stored under a common new grandparent node, node z in this example. In many situations, the re-organization of the application program's document data structure will be gradual, as the parser incrementally works on new input data. In other situations, major reorganization may occur, e.g., when unclassified ink is first analyzed and organized into a hierarchical data structure, as shown in FIG. 3, and electronic document node reuse may not be as useful in these major reorganization situations.

Now, the time has come in the analysis procedure when the analysis results are written back into the application program's data structure (represented by arrow 610 in FIG. 6A), to thereby provide an updated or revised application program data structure. Note arrows 532 and 534 in FIG. 5. Prior to writing the results in the application program, however, a determination is made as to which original document nodes can be reused in the revised application program data structure and/or where the original nodes should be reused in that data structure. The explanation of how systems and methods according to this example of the invention make these determinations utilizes the model 612 shown in FIG. 6A. Specifically, the model 612 shown in FIG. 6A includes representations of the leaf node A, B, C, and D. Some or all of the data from the original leaf nodes A, B, C, and D in data structure 600 may be used in writing the leaf nodes A, B, C, and D in the revised document data structure, although some data associated with the leaf nodes A, B, C, and D may change and/or need to be newly created at the result write time (e.g., data associated with identification of the node's immediate parent node, and the like). Notably, at this time, the parent nodes and/or the grandparent nodes to be reused in the revised application program data structure have not been identified, so these nodes are identified by question marks in the model 612. In order to avoid original data loss and/or to reduce the data writing and processing time (and thereby reduce and/or minimize the time period that the application program's electronic document 512 is unavailable to the user 502), systems and methods according to this example of the invention seek to reuse the data corresponding to at least some of the ancestor nodes to the extent possible. In at least some situations, particularly where the parser is making gradual changes to the document structure, reuse of existing application program electronic document nodes can save substantial processing and data writing time, and it can maintain and preserve important original data.

As mentioned above, one motivation for node reuse in writing analysis results to an application program relates to the fact that in some instances, application programs will associate one or more of their original electronic document nodes with one or more sets of properties (or other data) that are transparent to and/or not used or maintained in the analysis systems and methods. If all original document nodes are simply rewritten whenever a parser acts on a document and writes its results to an application program, these properties may be lost (e.g., if the parser does not maintain the properties or data), and if this information is needed by the application program, these properties or other data would have to be recalculated or redetermined. For some properties, such recalculation or redetermination is not possible, and at the very least, it would require processing time and resources. Therefore, the more an analysis program or application program can reuse existing electronic document nodes during re-organization and/or re-writing of an application program's data structure (or other data structure), the more that these properties and/or other data can be preserved and reused (as opposed to being recalculated or redetermined from scratch, if doing so is even possible). Additionally, if an analysis program or application program has to completely rewrite a new electronic document each time a slight re-organization of its data occurs, this will cause a lot of data churn (e.g., calculated properties being destroyed and recalculated). Such data churn may cause significant processing delays, significant electronic document unavailability, and ultimately user frustration.

A "vote" based scheme or processing may be used in accordance with at least some examples of this invention to determine the most appropriate original ancestor node(s) (e.g., parent nodes, grandparent nodes, great grandparent nodes, etc.) to use for a given node in a revised data structure. More specifically, each leaf node in a grouping may be thought of as casting a "vote" for its original ancestor nodes, and the ancestor node at each hierarchical level receiving the most votes at a given node position will be selected for use at that node position (assuming that the ancestor node receiving the most votes is available or otherwise selected for use).

As illustrated in the example of FIG. 6B, the original parent nodes of the various leaf nodes A, B, C, and D present in the model 612 are determined by the "voting" method. More specifically, as shown, in data structure 600 (FIG. 6A), leaf node A had original parent node P, and leaf nodes B and C had original parent node Q. Therefore, in determining the best fit for new parent node 614 of leaf nodes A, B, and C (which are to be grouped together in the revised application program data structure), node P received one vote (from leaf node A) and node Q received two votes (from leaf nodes B and C). Likewise, when voting for the appropriate new grandparent node 616, nodes A, B, and C all vote for original node Y from the original application program data structure 600 (totaling three votes). Node D is to be separately grouped under new parent node 618 in the revised application program data structure. Therefore, in voting for its original parent and grandparent nodes, node D votes for original node Q as its parent node and original node Y as its grandparent node.

Given the "votes" for the various ancestor nodes, the new nodes 614, 616, and 618 then are assigned and the revised application program data structure is written (represented by arrow 620 in FIG. 6B). Node 616 received four votes for original root node Y and no other votes. Accordingly, the data corresponding to node Y will be reused (at least to some extent) when writing the new root node 616 in revised data structure 622 in the application program. If necessary, data originally included in node Y (from data structure 600) may be modified or deleted, and/or additional data may be added, so that node Y can be used in data structure 622 and so that it properly relates to the content of this new data structure 622. Similarly, new node 614 received two votes for original node Q and one vote for original node P. Accordingly, data from original node Q will be reused (at least to some degree) when writing new node 614 in the revised data structure 622 of the application program. New node 618 received one vote for original node Q (from leaf node D). However, in this example, because original node Q was reused at node 614 in the revised data structure 622, that node is no longer available for reuse as node 618 (a node can only be reused once in this example system and method). Therefore, a new parent node (node R) will be created under root node Y, and leaf node D will be grouped under and/or otherwise associated with new parent node R in the data structure 622.

The new data structure 622 is now written in the application program, e.g., by transforming the original document data structure 600 to the final, new (or revised) document data structure 622 in the example of FIGS. 6A and 6B. The steps used in writing revised document data structure 622 is this example are as follows:

1. On node P, delete child node A;
2. On node Y, delete child node P;
3. On node Q, create child node A
4. On node Q, move child node A to the first position;
5. On node Q, delete child node D;
6. On node Y, create new child node R; and
7. On node R, create child node D.

Alternatively, in at least some examples of the invention, nodes A and D may be "reparented" rather than deleted and recreated, which can be used to increase node reuse and avoid the processing needed to delete nodes and create new nodes.

As generally described above, in at least some examples of this invention, the "votes" for the various ancestor nodes are collected and/or otherwise determined in a "bottom up" manner based on the hierarchical data structure (e.g., leaf nodes first vote for parent nodes, then grandparent nodes, etc., up to the top or root of the data structure). Of course, any order of collecting and/or determining the "votes" may be used without departing from the invention. Additionally, in the example above, the node identities are "assigned" to the various nodes in the new data structure in a top-down/left-to-right manner. Of course, any order or scheme for assigning the various node identities may be used without departing from the invention.

In the illustrated example, the original nodes are assigned in the new data structure at the first encountered node location where they received the most votes (moving top-down, left-to-right), and once the original nodes are assigned a location in the new data structure, the original nodes are unavailable for further reuse or node location assignments. Of course, other information also could be taken into consideration when assigning node values in the new data structure. For example, if an original node wins the vote at more than one new node location, it may be more efficient to use the original node at the second encountered location (moving top-down, left-to-right) as compared to the first encountered location (e.g., in FIGS. 6A and 6B, using node Q at location 618 and using node P at location 614 ultimately may result in less data re-write and/or less computer processing time as compared to using node Q at location 614 and creating new node R). Accordingly, systems and methods according to at least some examples of the invention may take other information into consideration when assigning new node identities, such as the most effective or efficient reuse of a node from an original data preservation point of view, from a reduction in rewrite procedures point of view, and/or from a reduction in processing time point of view. As another example, data included in one potential parent node as compared to another potential parent node (such as property data stored under one potential parent node as compared to another potential parent node) may result in advantages if one node were to be selected over the other node (e.g., from an original data preservation point of view, from a reduction in rewrite procedures point of view, and/or from a reduction in processing time points of view). This type of additional information also may be taken into consideration without departing from the invention. Any other suitable or desired additional information may be taken into consideration when assigning new node identities based on reuse of original nodes without departing from the invention.

The additional information also may be taken into consideration in any suitable manner without departing from the invention. For example, when a first potential parent node receiving one or more votes contains data or other information (e.g., as a property stored as part of the node) that is not included in a second potential parent node receiving one or more votes, the first potential node may be selected automatically over the second potential node, so that the additional data will not be lost. As another example or alternative, the votes for the first potential node may be weighted more than votes for the second potential node rather than automatically discarding or overriding the votes for the second potential node. For example, each vote for the first potential node (which may include the additional data or information) may count as two votes, and the ultimate winner of the weighted vote then will be selected for reuse as the new node. In this manner, the chances of reusing the node having the additional data or information are increased, but not excessively so and not at the expense of simply discarding all votes for other potential nodes. Of course, other ways of weighting the vote or taking the additional data or information into consideration may be used without departing from the invention.

Also, in the illustrated example, once an original node is reused, that node is no longer available for further use in the new data structure. If desired, in at least some examples of the invention, the various ancestor nodes may be reused at multiple locations in the data structure, for example, by storing a copy of the original potential parent nodes and using data from the stored copies to create the new node as needed.

In the example of FIGS. 6A and 6B, the revised data structure 622 has the same number of ancestor nodes at the various hierarchical levels as present in the original data structure 600, but the leaf nodes A-D are rearranged and associated with different parent nodes during the illustrated operations. Systems and methods according to examples of the invention also may be used in situations where the numbers of ancestor nodes at the various levels change and/or where the ultimate arrangement of the leaf nodes changes. FIGS. 7A and 7B illustrate another example in accordance with at least some aspects of the invention that demonstrates some of these additional potential features. As illustrated in FIG. 7A, when the procedure originally starts, the application program's document structure 700 includes five total leaf nodes (A, B, C, D, and E (as noted above, the leaf nodes may contain electronic ink stroke data, or the like)). Three leaf nodes (A, B, and C) originally are grouped under one parent node (node P), and two leaf nodes (D and E) originally are grouped under another parent node (node Q). Both parent nodes (and hence all of the leaf nodes) originally are grouped under a common root node, node Y.

The application program's document data structure 700 is copied or otherwise utilized to prepare a data structure 704 for further analysis (e.g., conducted by a parser system or the like). This copying or other action is illustrated in FIG. 7A by arrow 702. Notably, in this example, data structure 704 has a hierarchical data structure that corresponds to the data structure 700 present in the application program, although, as noted above, this is not a requirement in all systems and methods according to the invention (additionally, as noted above, data structure 704 may include information not included and/or used in data structure 700, and vice versa). During the analysis procedure (e.g., a parsing procedure, as illustrated by arrow 706 in FIG. 7A), the original data structure 704 is changed to the analysis result document data structure 708 (e.g., based on the parsing results, such as a layout analysis of various features in the electronic document, and/or the like). In the illustrated example, the analysis result document data structure 708 includes the five originally present leaf nodes (nodes a, b, c, d, and e) now grouped under three parent nodes (nodes a and b under parent node i, nodes c and d under parent node j, and node e under parent node k). All of the parent nodes (and hence all of the leaf nodes) in this example fall under a common root node, node z.

The analysis results now need to be written back into the original application program (illustrated as arrow 710 in FIG. 7A), but first potential original ancestor node reuse is considered. The explanation of how to determine node reuse in this example utilizes model 712. More specifically, as illustrated in FIG. 7A, the leaf nodes (A, B, C, D, and E) are arranged as shown in model 712, but the identification of their ancestor nodes has not been made (the ancestor nodes are shown as question marks in model 712). Systems and methods according to this example of the invention determine or "vote" for the various ancestor nodes based on their respective ancestor nodes from the original data structure 700, e.g., in an effort to reuse various nodes from the original data structure 700, to preserve the original data and/or reduce data writing or other processing time.

FIG. 7B illustrates the "vote" or ancestor node determination procedure in this example. Specifically, as shown, application program leaf nodes A and B, which are to be grouped together under common node 714 in the revised data structure, each had original node P as their parent node and original node Y as their grandparent node (see data structure 700). Leaf nodes C and D are to be grouped together under common node 716 in the revised application program data structure, as illustrated in FIG. 7B. As evident from FIG. 7A, node C will vote for node P as its parent node, while node D will vote for node Q as its parent node, based on their respective original parent nodes from data structure 700. Both nodes C and D vote for original node Y as their grandparent node. Finally, leaf node E, which is to be individually grouped under parent node 718 in the revised application program data structure, will vote for node Q as its parent node and node Y as its grandparent node.

Now, the new nodes 714, 716, 718, and 720 are assigned node values in the revised data structure by reusing nodes from the original data structure 700, and the revised data structure 724 is written into the application program (represented as arrow 722 in FIG. 7B). Starting top-down and moving left-to-right in the model 712 (although, as discussed above, other assignment orders are possible without departing from the invention), grandparent or root node 720 has received all five votes for original node Y (indeed, all of the original leaf nodes A, B, C, D, and E fell under this common root node Y, as shown in FIG. 7A). Accordingly, node 720 is assigned as original node Y (and data corresponding to original node Y may be reused in writing node 720 in the final, new data structure 724 in the application program). Based on the 2-0 vote in favor of original parent node P as node 714, node 714 is assigned as node P, and data corresponding to original node P may be reused in writing node 714 in the final, new data structure 724. As for node 716, this node received one vote for node P and one vote for node Q. However, because node P already was reused in writing node 714, node 716 is assigned as node Q, and data corresponding to original node Q may be reused in writing node 716 in the final, new data structure 724. As for node 718, because all of the original parent nodes from data structure 700 previously were used in preparing data structure 724, a new node (node N) is created for node 718.

Of course, the order of voting and node assignment orders and/or other procedures can be changed, and/or data corresponding to various nodes may be used at multiple locations, without departing from the invention, for example, by the various methods and procedures generally described above.

FIGS. 7A and 7B illustrate an example where the number of nodes at a given hierarchical level increases during an analysis process. FIGS. 8A through 8D illustrate a more complex example of procedures according to the invention, and in this instance the overall numbers of nodes in two different hierarchical levels decrease. Those skilled in the art will recognize, of course, that the numbers of nodes in any hierarchical level may increase, decrease, or stay the same, and indeed the number of hierarchical levels in the data structure, may increase, decrease, or stay the same, without departing from this invention (for example, parsing or layout analysis of previously unclassified ink strokes may result in an increase in the number of hierarchical levels in a data structure, as shown in FIG. 3). For simplicity, the example of FIGS. 8A through 8D shows the various processing taking place in this example at the analysis program level, not at the application program level. Those skilled in the art will recognize that the various processes described above in conjunction with FIGS. 6A through 7B, including the movement of data between an application program and an analysis engine, also may take place in the examples of FIGS. 8A through 8D. Additionally, those skilled in the art will recognize that the processing described in conjunction with FIGS. 6A through 8D, including the various "voting," "determining," and/or node "assigning" processes, may take place at the application program level, at the analysis system level, at a parser system level, at a recognition system level, at another level, and/or at any combination of these different levels, without departing from the invention.

Figure 8A:
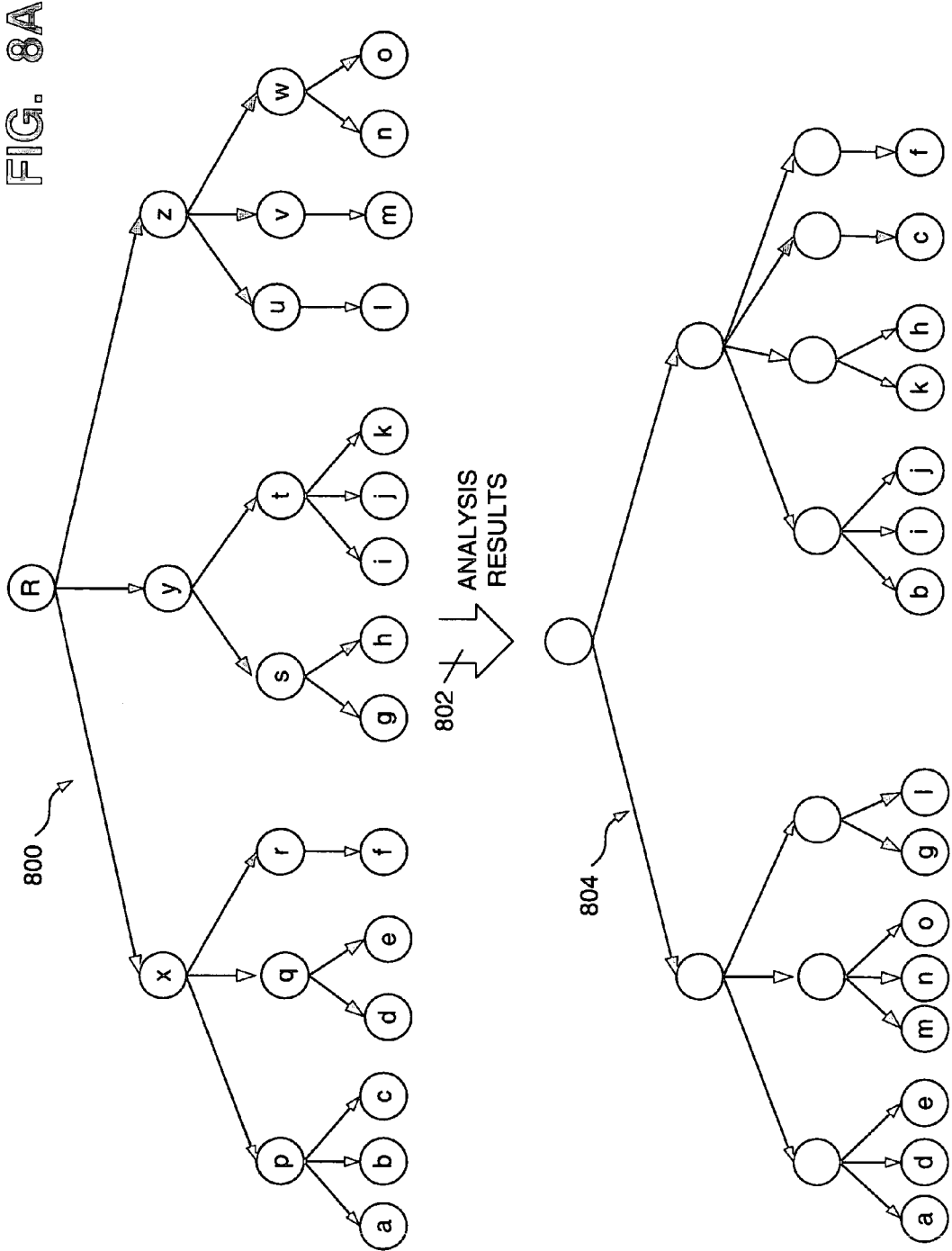

FIG. 8A illustrates an example data structure 800 as it might exist when data initially is copied from an application program to an analysis system for further analysis (e.g., to a parser system, a recognition system, etc.). As described above, this data structure 800 may correspond to electronic ink data or any other suitable or desired type of data, optionally after some earlier processing has taken place (e.g., and the present call to the analysis system may be an incremental call to the analysis system that follows an earlier analysis on some or all of the data present in data structure 800). At this initial time, the data structure 800 of this example has four hierarchical levels, namely: the leaf node level (nodes a-o, which may correspond to individual ink strokes or ink words); the parent node level (nodes p-w); the grandparent node level (nodes x-z); and the root node level (node R).

After the analysis system performs its processing on the input data (indicated in FIG. 8A by arrow 802), a new or revised data structure 804 is produced that includes the analysis results. As shown in FIG. 8A, the analysis result data structure 804 includes the same leaf nodes a-o as in the original data structure 800, but the leaf nodes are arranged differently, and the ancestral hierarchical structure associated with the various nodes also has changed. While the data structure 804 of FIG. 8A has the same number of hierarchical levels as the original data structure 800, those skilled in the art will recognize that additional levels may be added and/or originally existing levels may be omitted from the analysis result data structure 804 (as compared to the original data structure 800), without departing from the invention.

FIGS. 8B and 8C illustrate a model "voting" or ancestral "determining" steps for data structure 804 that may take place in accordance with examples of this invention. First, FIG. 8B illustrates the determinations made in this example in identifying the candidate parent nodes for the various leaf nodes a-o for potential reuse when writing a revised data structure, for example, in the application program (e.g., FIG. 8B illustrates a model of the leaf node "vote" for their original parent nodes). The various votes or determinations are explained in more detail below:

(A) Original leaf nodes a, d, and e are to be grouped together in the revised data structure under common parent node 806. Node a votes for its original parent node (node p), and nodes d and e vote for their original parent node (node q).
(B) Leaf nodes m, n, and o are to be grouped together in the revised data structure under common parent node 808. Node m votes for its original parent node (node v), and nodes n and o vote for their original parent node (node w).
(C) Leaf nodes g and l are to be grouped together in the revised data structure under common parent node 810. Node g votes for its original parent node (node s), and node l votes for its original parent node (node u).
(D) Leaf nodes b, i, and j are to be grouped together in the revised data structure under common parent node 812. Node b votes for its original parent node (node p), and nodes i and j vote for their original parent node (node t).
(E) Leaf nodes k and h are to be grouped together in the revised data structure under common parent node 814. Node k votes for its original parent node (node t), and node h votes for its original parent node (node s).
(F) Leaf node c is to be separately grouped in the revised data structure under parent node 816. Node c votes for its original parent node (node p).
(G) Leaf node f is to be separately grouped in the revised data structure under parent node 818. Node f votes for its original parent node (node r).

The various vote totals or determination results for the parent node hierarchical level are shown in FIG. 8B.

FIG. 8C illustrates the determinations made in this example in identifying the candidate grandparent nodes for the various leaf nodes a-o for potential reuse when writing a revised, post-analysis data structure, for example, in the application program (e.g., FIG. 8C illustrates a model of the leaf nodes a-o "vote" for their original grandparent nodes). The various votes or determinations are explained in more detail below:

(A) Original leaf nodes a, d, e, m, n, o, g, and l are to be grouped together in the revised data structure under common grandparent node 820. Nodes a, d, and e vote for their original grandparent node (node x), node g votes for its original grandparent node (node y), and nodes l, m, n, and o vote for their original grandparent node (node z).
(B) Leaf nodes b, i, j, k, h, c, and f are to be grouped together in the revised data structure under common grandparent node 822. Nodes b, c, and f vote for their original grandparent node (node x), and nodes i, j, k, and h vote for their original grandparent node (node y). New grandparent node 822 does not contain any leaf nodes originally grouped under original grandparent node z, so grandparent node z receives no votes as a potential node for node 822.

The various vote totals or determination results for the grandparent node hierarchical level are shown in FIG. 8C. Because all of the original leaf nodes a-o in data structure 800 fell under the common great-grandparent node R (the root node), the voting for the great-grandparent node 824 is not explained in further detail.

Figure 8D:
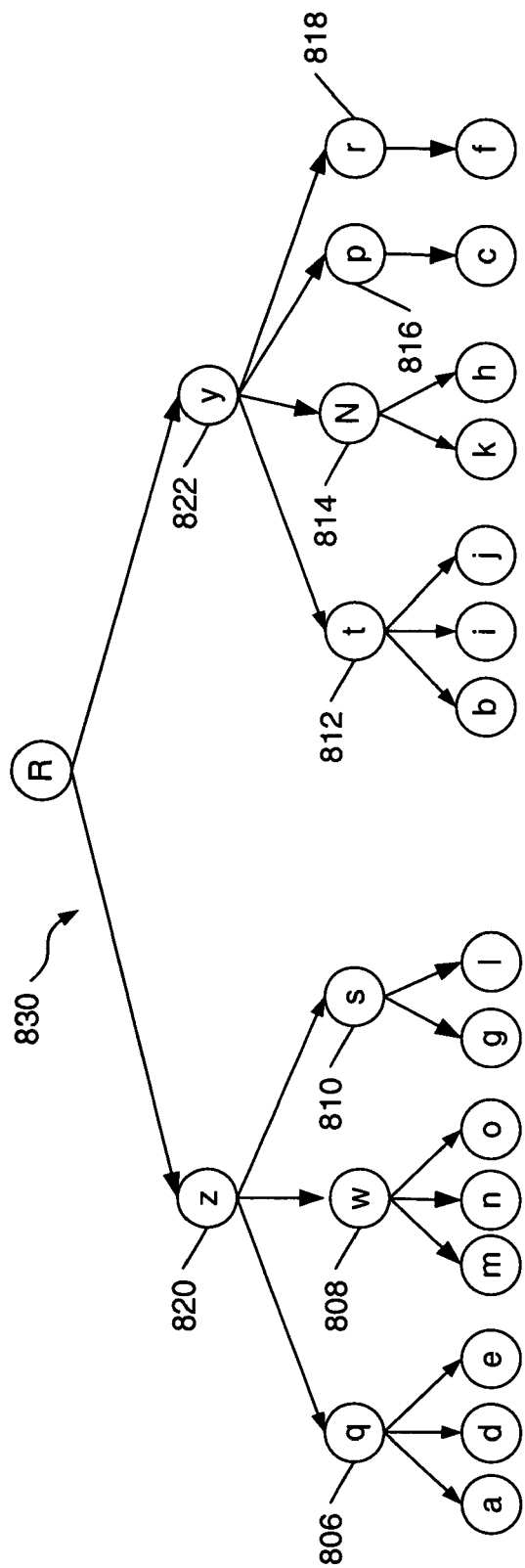

FIG. 8D illustrates a revised data structure 830 of this example when written after the results of the various ancestral votes or determinations are taken into account (e.g., so that, in at least some instances, data relating to original ancestor nodes may be reused in preparing the revised data structure 830, to thereby preserve and maintain data associated with the original electronic document nodes and/or to reduce data writing time and/or computer processing time). The ancestor node values in this example are assigned working from the hierarchical top of the data structure to the bottom, and from left-to-right on each hierarchical level. As described above, because all of the original leaf nodes a-o fell under the common root note R in the original data structure 800, all of the leaf nodes would vote for root node R as the new great-grandparent node, and data from this original node R would be reused to at least some extent when writing the root node R in data structure 830, as shown in FIG. 8D.

Next, the identities of the grandparent nodes are assigned, when possible, using data from the grandparent nodes from the original data structure 800. As shown in FIG. 8C, grandparent node 820 received four votes for original node z, three votes for original node x, and 1 vote for original node y. Accordingly, as illustrated in FIG. 8D, node 820 is assigned as original node z (and data from original node z may be reused when writing data structure 830, e.g., in an application program). Likewise, grandparent node 822 received four votes for original node y and three votes for original node x. Therefore, node 822 is assigned as original node y (and data from original node y may be reused when writing data structure 830). Original grandparent node x is not reused in the revised data structure 830.

Moving downward in the hierarchical structure to the parent node level, the parent node identities are assigned as follows, based on the vote or determinations illustrated in conjunction with FIG. 8B:

Node 806—Assigned data from original node q
Node 808—Assigned data from original node w
Node 810—Assigned data from original node s
Node 812—Assigned data from original node t
Node 816—Assigned data from original node p
Node 818—Assigned data from original node r In general, the node assignment scheme used in FIG. 8D is like that described above in conjunction with FIGS. 6A through 7B. Specifically, as illustrated, original node values in this example are not reused more than once, even if they win the vote at two new node locations. Accordingly, because node s was used in assigning node 810 and node t was used in assigning node 812, neither node was available for further reuse when node 814 was to be assigned. Accordingly, because none of the candidate parent nodes were available for reuse as node 814, a new node (node N) must be created for use as node 814. Alternatively, if nodes were reusable more than once, as potentially possible in some examples of the invention, then either of node t or node s may have been reused as node 814. The final analyzed data structure 830 for this example, when written with the assigned, reorganized, and new node values, is shown in FIG. 8D.

As mentioned above, the ancestor nodes are assigned in a top-down, left-to-right manner in this example of the invention. Also, in this example (and in the other examples described above), when a node vote is tied, the first available original node (e.g., the first available candidate node moving from left-to-right across the leaf nodes) is assigned as the parent node. For example, as illustrated in FIGS. 8B and 8D, when the votes for node 810 were tabulated, node s had one vote and node u had one vote. Because the first vote cast moving left-to-right across the leaf nodes g and l was for node s (by leaf node g), node 810 was assigned as corresponding to original node s. Those skilled in the art will recognize, of course, that other ways of handling this tie situation may be used without departing from the invention. For example, any previously unused node may be designated for use as the default node for breaking the tie without departing from the invention (e.g., the second voted node, the last voted node, etc.). As another example, additional information could be taken into consideration before the node values are assigned. For example, by looking at all the votes for the parent nodes 806-818, one could see that node s potentially may be used as node 810 and as node 814 (i.e., node s tied for the lead vote recipient at nodes 810 and 814), whereas node u had no other potential reuse locations (no other parent node 806-818 received a vote for node u). Accordingly, an algorithm may be developed to take this additional information into account, such that data corresponding to node u may be reused at node 810 to thereby keep node s available for other potential reuses (e.g., at node 814). In this manner, node u may be reused as node 810 and node s may be reused at node 814, thereby obviating the need for creation of new node N. Of course, other information (such as weighted or double votes, as described above) may be used in an algorithm for determining node assignments without departing from the invention. In at least some instances, the desire (and time and processor resource savings) associated with reusing data and/or the nodes from the original data structure may be balanced against the time and resources required to perform the additional processing needed to maximize reuse of a node and/or against the time and resources required to create one or more new nodes from scratch, and a programmer or algorithm may decide to choose which way to proceed for a given system or method.

Those skilled in the art will recognize, of course, that no actual "voting" needs to take place in order to use systems and methods according to examples of this invention. Rather, the "voting" analogy is used as a model to help explain the determinations and processing used in examples of systems and methods according to the invention.

While the specific examples of the invention described above are optimized for processing electronic ink data and machine-generated text in the form of conventional English and other Latin based words and text (e.g., read left-to-right and top-to-bottom), the present invention is not limited to use on those types of languages and on that type of electronic ink data and machine-generated text data. Those skilled in the art will recognize that aspects of this invention can be applied to any type of electronic data, including handwritten text or characters in any language and written or read in any direction without departing from the invention. Additionally, aspects of this invention can be applied to recognition and processing of other types of data and machine-generated objects without departing from the invention, such as data and elements in charts, diagrams, graphs, flowcharts, etc.; musical data or symbols; mathematical or scientific data or symbols; drawings; etc. Moreover, aspects of this invention can be applied to any type of data structure or data from any source, not limited to data originating only from electronic ink sources. In general, aspects of the invention may be applied in any setting where a document analysis service or method or other program may be called upon to convey or "write" its analysis results back to another program (e.g., an application program) with a minimal and/or reduced amount of data re-organization, rewrite, or processing time, as compared to reconstructing the data structure anew.

Finally, the present invention also relates to computer-readable media including computer-executable instructions stored thereon for performing various methods and/or for use in various systems, including the systems and/or methods described above. The computer-readable media may constitute computer-executable instructions stored on the various specific examples of computer-readable media described above.

V. CONCLUSION

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A computer-implemented method for processing data using a computer system having processor, memory, and data storage subsystems, the computer-implemented method comprising:
    providing a mirror data structure to represent a first data structure;
    supplying user input data to a plurality of parser analysis engines via snapshots of the mirror data structure;
    operating on the snapshots by the plurality of parser analysis engines to form a second data structure, wherein the second data structure includes at least a first set of leaf nodes under a first ancestor node and a second set of leaf nodes under a second ancestor node;
    identifying one or more potential candidate nodes for the first ancestor node via the processor based, at least in part, on a bottom-up hierarchical structured selection of ancestor nodes from the first data structure associated with the leaf nodes in the first set;
    identifying one or more potential candidate nodes for the second ancestor node via the processor based, at least in part, on a bottom-up hierarchical structured selection of ancestor nodes from the first data structure associated with the leaf nodes in the second set;
    assigning the first ancestor node based on a top-down hierarchical structured selection of the potential candidate node most often identified as associated with the leaf nodes in the first set; and
    assigning the second ancestor node based on a top-down hierarchical structured selection of one or more criteria other than the potential candidate node most often identified as associated with the leaf nodes in the second set.

2. A computer-implemented method according to claim 1, wherein assigning the second ancestor node is based upon the second most often identified potential candidate node.

3. A computer-implemented method according to claim 1, wherein assigning the second ancestor node comprises creating a new node.

4. A computer-implemented method according to claim 1, further comprising:
    determining which potential candidate node to assign as the first ancestor node and which potential candidate node to assign as the second ancestor node, based, at least in part, on a determination of which arrangement of potential candidate nodes will most reduce data rewrite processing operations when converting an original document data structure to a form represented by the second data structure.

5. The computer-implemented method of claim 1, further comprising: receiving user touch input via a touch-sensitive user input device.

6. A computer-implemented method for processing data using a computer system having processor, memory, and data storage subsystems, the computer-implemented method comprising:
- transforming user input data from a first data structure to a second data structure via one or more intermediate mirror data structures, wherein the second data structure includes at least a first set of leaf nodes under a first ancestor node and a second set of leaf nodes under a second ancestor node;
- identifying one or more potential candidate nodes for the first ancestor node via a vote based processing of parent nodes from the first data structure associated with the leaf nodes in the first set;
- identifying one or more potential candidate nodes for the second ancestor node via the vote based processing of the parent nodes from the first data structure associated with the leaf nodes in the second set;
- assigning the first ancestor node based on a selection of the potential candidate node most often identified from the vote based processing as associated with the leaf nodes in the first set, wherein the assigned first ancestor node comprises data preserved and maintained from the first data structure; and
- assigning the second ancestor node based on a selection of one or more criteria including the potential candidate node most often identified from the vote based processing as associated with the leaf nodes in the second set, wherein:
- said transforming data, said identifying one or more potential candidate nodes for the first ancestor node, said identifying one or more potential candidate nodes for the second ancestor node, said assigning the first ancestor node, and said assigning the second ancestor node are all conducted incrementally as additional user input is received.

7. A computer-implemented method according to claim 6, wherein assigning the second ancestor node is based upon the second most often identified potential candidate node.

8. A computer-implemented method according to claim 7, wherein assigning the first ancestor node and assigning the second ancestor node further is based, at least in part, on a determination of which arrangement of potential candidate nodes will most efficiently reuse the leaf nodes when converting an original document data structure to a form represented by the second data structure.

9. A computer-implemented method according to claim 6, wherein assigning the second ancestor node comprises creating a new node.

10. A computer-implemented method according to claim 6, further comprising:
- creating a revised document data structure based on the second data structure and the assigned potential candidate nodes.

11. A computer-implemented method according to claim 6, wherein the assigned first ancestor node differs from the assigned second ancestor node.

12. A computer-implemented method according to claim 6, wherein the transforming includes parsing electronic ink data into a hierarchical data structure corresponding to the second data structure.

13. A computer-readable medium having computer-executable instructions stored thereon for performing the method of claim 6.

14. A data processing computer system having processor, memory, and data storage subsystems, the data processing computer system comprising:
- a computer-readable storage medium containing user input data representing a first data structure;
- a parser, comprising: one or more mirror data structures of the first data structure received by one or more parser analysis engines, wherein the one or more parser analysis engines operate concurrently with the user input to the first data structure; and
- a processor programmed and adapted to: (a) transform the user input data in the first data structure to a second data structure via the one or more mirror data structures, wherein the second data structure includes at least a first set of leaf nodes under a first ancestor node and a second set of leaf nodes under a second ancestor node; (b) identify one or more potential candidate nodes for the first ancestor node via a vote based processing of ancestor nodes from the first data structure associated with the leaf nodes in the first set; (c) identify one or more potential candidate nodes for the second ancestor node via the vote based processing of the ancestor nodes from the first data structure associated with the leaf nodes in the second set; (d) assign the first ancestor node based on a selection of the potential candidate node most often identified from the vote based processing as associated with the leaf nodes in the first set; and (e) assign the second ancestor node based on a selection of one or more criteria including the potential candidate node most often identified from the vote based processing as associated with the leaf nodes in the second set.

15. A data processing computer system according to claim 14, wherein the processor is further programmed and adapted to assign the second ancestor node based upon the second most often identified potential candidate node.

16. A data processing computer system according to claim 14, wherein the assigned first ancestor node differs from the assigned second ancestor node.

17. A data processing computer system according to claim 14, wherein the processor is further programmed and adapted to determine which potential candidate node to assign as the first ancestor node and which potential candidate node to assign as the second ancestor node based, at least in part, on assigning more weight to a leaf node which contains additional data or information when converting an original document data structure to a form represented by the second data structure.

18. A data processing computer system having processor, memory, and data storage subsystems, the data processing computer system comprising:
- a computer-readable medium containing user input data representing a first data structure;
- one or more mirror data structures representing the first data structure and sent to a corresponding one or more parser analysis engines, wherein the one or more parser analysis engines operate on the one or more mirror data structures concurrently with the user input data to the first data structure; and
- a processor programmed and adapted to: (a) transform data in the first data structure to a second data structure via the one or more mirror data structures, wherein the second data structure includes at least a first set of leaf nodes under a first ancestor node and a second set of leaf nodes under a second ancestor node; (b) identify one or more potential candidate nodes for the first ancestor node based, at least in part, on a bottom-up hierarchical structured selection of ancestor nodes from the first data structure associated with the leaf nodes in the first set; (c) identify one or more potential candidate nodes for the second ancestor node based, at least in part, on a bottom-up hierarchical structured selection of ancestor nodes from the first data structure associated with the leaf nodes in the second set; (d) assign the first ancestor node based on a top-down hierarchical structured selection of the potential candidate node most often identified as associated with the leaf nodes in the first set, wherein the assigned first ancestor node comprises data preserved and maintained from the first data structure; and (e) assign the second ancestor node based on a top-down hierarchical structured selection of one or more criteria other than the potential candidate node most often identified as associated with the leaf nodes in the second set.

19. A data processing computer system according to claim 18, wherein the processor is further programmed and adapted to assign the second ancestor node based upon the second most often identified potential candidate node.

20. A data processing computer system according to claim 19, wherein the first ancestor node and second ancestor node are assigned at least in part, on reusing the first ancestor node or the second ancestor node when converting an original document data structure to a form represented by the second data structure.

21. A data processing computer system according to claim 18, wherein the data processing computer system comprises a user input device with a touch-sensitive display for receiving user touch input.

22. A data processing computer system according to claim 18, wherein the processor is further programmed and adapted to create a revised document data structure based on the second data structure and the assigned potential candidate nodes.

23. A data processing computer system according to claim 18, wherein the data in the first data structure represents electronic ink data.

24. A data processing computer system according to claim 18, wherein the transforming includes parsing electronic ink data into a hierarchical data structure corresponding to the second data structure.

* * * * *